United States Patent [19]
Townsend

[11] Patent Number: 5,918,926
[45] Date of Patent: Jul. 6, 1999

[54] AUTOMOBILE DOOR AND SEAT ARMREST

[75] Inventor: John A. Townsend, Pacifica, Calif.

[73] Assignee: Joalto Design Inc., Southfield, Mich.

[21] Appl. No.: 08/257,080

[22] Filed: Jun. 9, 1994

Related U.S. Application Data

[62] Division of application No. 07/912,790, Jul. 13, 1992.

[51] Int. Cl.$^6$ ................................ B60J 5/04; B60N 2/46
[52] U.S. Cl. ................................ 296/65.01; 296/146.4; 297/411.32
[58] Field of Search ............................ 296/68, 63, 146.2, 296/155, 65.01, 153, 146.4; 280/730 R, 730 A, 801.1, 807, 808, 730.1; 297/411.32, 481, 483, 485, 411.3, 411.39

[56] References Cited

U.S. PATENT DOCUMENTS

| | | | |
|---|---|---|---|
| 2,036,118 | 3/1936 | Carr | 296/68 |
| 3,191,993 | 6/1965 | Parks | 280/807 X |
| 3,322,463 | 5/1967 | Neale et al. | 297/411.3 |
| 3,594,036 | 7/1971 | Cadiou | 296/153 X |
| 3,623,768 | 11/1971 | Capener | 280/730 A |
| 3,807,799 | 4/1974 | Freedman | 297/411.32 |
| 3,888,540 | 6/1975 | Protze et al. | 297/411.32 X |
| 3,899,191 | 8/1975 | Royce | 296/68.1 X |
| 3,967,851 | 7/1976 | Stier | 297/411.32 X |
| 4,159,145 | 6/1979 | Quakenbush | 297/411.32 X |
| 4,230,414 | 10/1980 | Cheshire | 297/411.32 X |
| 4,323,278 | 4/1982 | Sukopp et al. | 280/801.1 X |
| 4,372,580 | 2/1983 | Motonami et al. | 280/808 |
| 4,600,217 | 7/1986 | Naumann et al. | 280/808 |
| 4,668,010 | 5/1987 | Fujiwara | 297/411.32 X |
| 4,881,778 | 11/1989 | Stephenson et al. | 297/411.32 X |
| 5,072,966 | 12/1991 | Nishitake et al. | 280/730 |
| 5,106,160 | 4/1992 | Nomura et al. | 297/411.32 |
| 5,112,079 | 5/1992 | Haland et al. | 280/730 |
| 5,172,790 | 12/1992 | Ishikawa et al. | 180/268 |
| 5,224,733 | 7/1993 | Simsic | 280/730 |
| 5,251,931 | 10/1993 | Semchena et al. | 280/730 |
| 5,277,441 | 1/1994 | Sinnhuber | 280/735 X |
| 5,290,084 | 3/1994 | Sinnhuber | 296/68.1 |
| 5,316,336 | 5/1994 | Taguchi et al. | |
| 5,348,342 | 9/1994 | Haland et al. | 180/274 |

FOREIGN PATENT DOCUMENTS

| | | | |
|---|---|---|---|
| 1220266 | 6/1966 | Germany | 296/65.1 |
| 2038050 | 2/1972 | Germany | 296/153 |
| 3344707 | 6/1985 | Germany | 297/411.32 |
| 3435678 | 6/1986 | Germany | 297/481 |
| 3701419 | 7/1988 | Germany | 297/378.11 |
| 3-281455 | 12/1991 | Japan . | |
| 4-50052 | 2/1992 | Japan . | |
| 4-356246 | 12/1992 | Japan . | |

*Primary Examiner*—Dennis H. Pedder
*Attorney, Agent, or Firm*—Rader, Fishman & Grauer PLLC

[57] ABSTRACT

Various advances are disclosed pertaining to vertically sliding automobile doors of the type which retract under the vehicle floor to open, and rotate upward to close, and in the elevated closed position become an integral part of the vehicle's structural chassis frame. The inventive improvements include: a belly pan spaced below the vehicle floor and side sills under the door openings which serve as fully stressed structural members of the vehicle's chassis; a flap acting as a threshold and serving to cover the door when in a recessed position; door guides which allow the door to "float" in the door tracks; a door drive system employing a perforated, flexible tape; a latching system to hold the door in the elevated, closed position; an improved side intrusion member and anchoring system therefor; and an outboard armrest pivotally mounted, having a lowered working position and a raised retracted position, also serving to open and close the door, house at least one side impact air bag, and or carry progressively deformable material. An embodiment is also disclosed wherein a rear door and window of a vehicle are cooperatively retractable into a pocket formed on the roof of the vehicle.

1 Claim, 20 Drawing Sheets

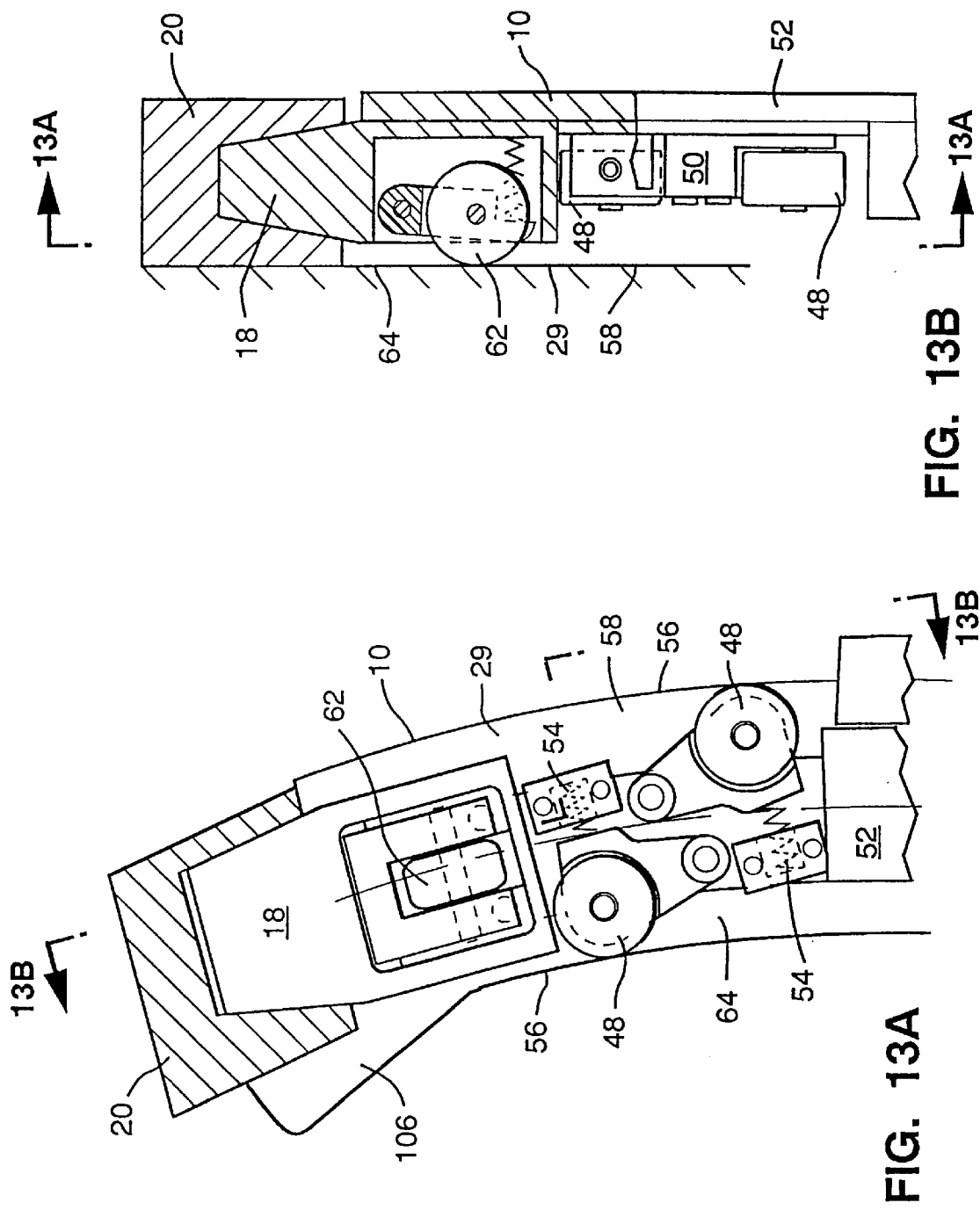

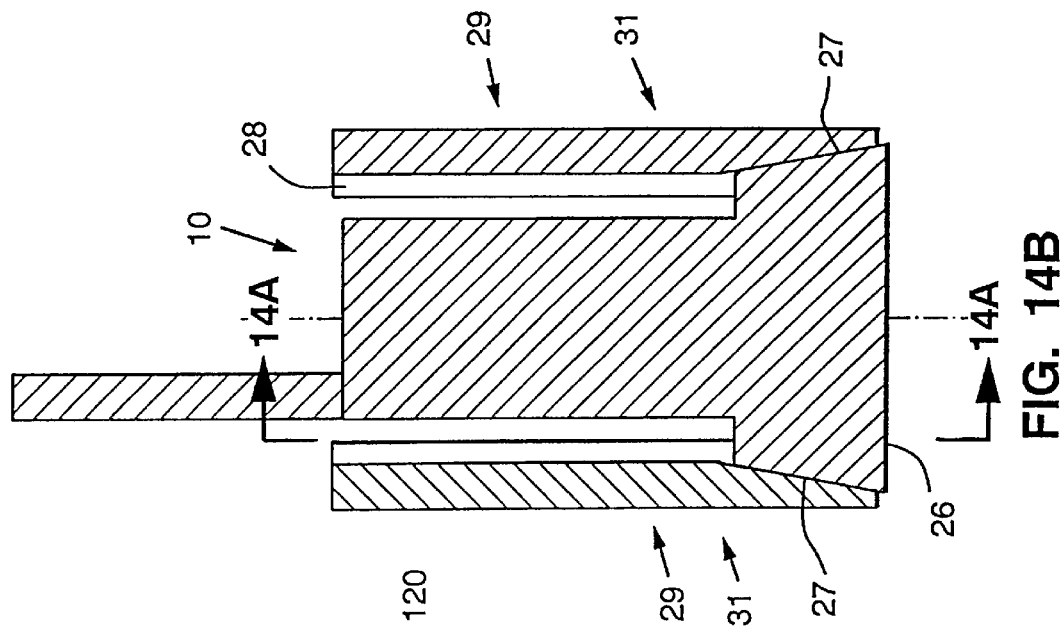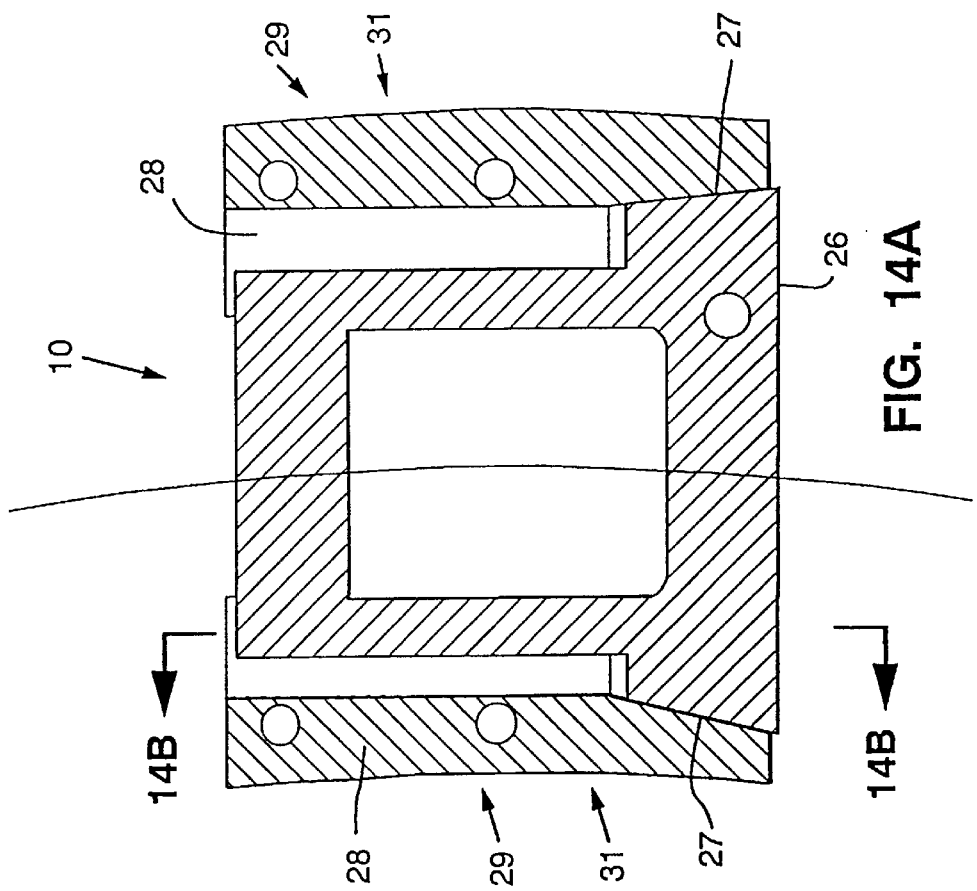

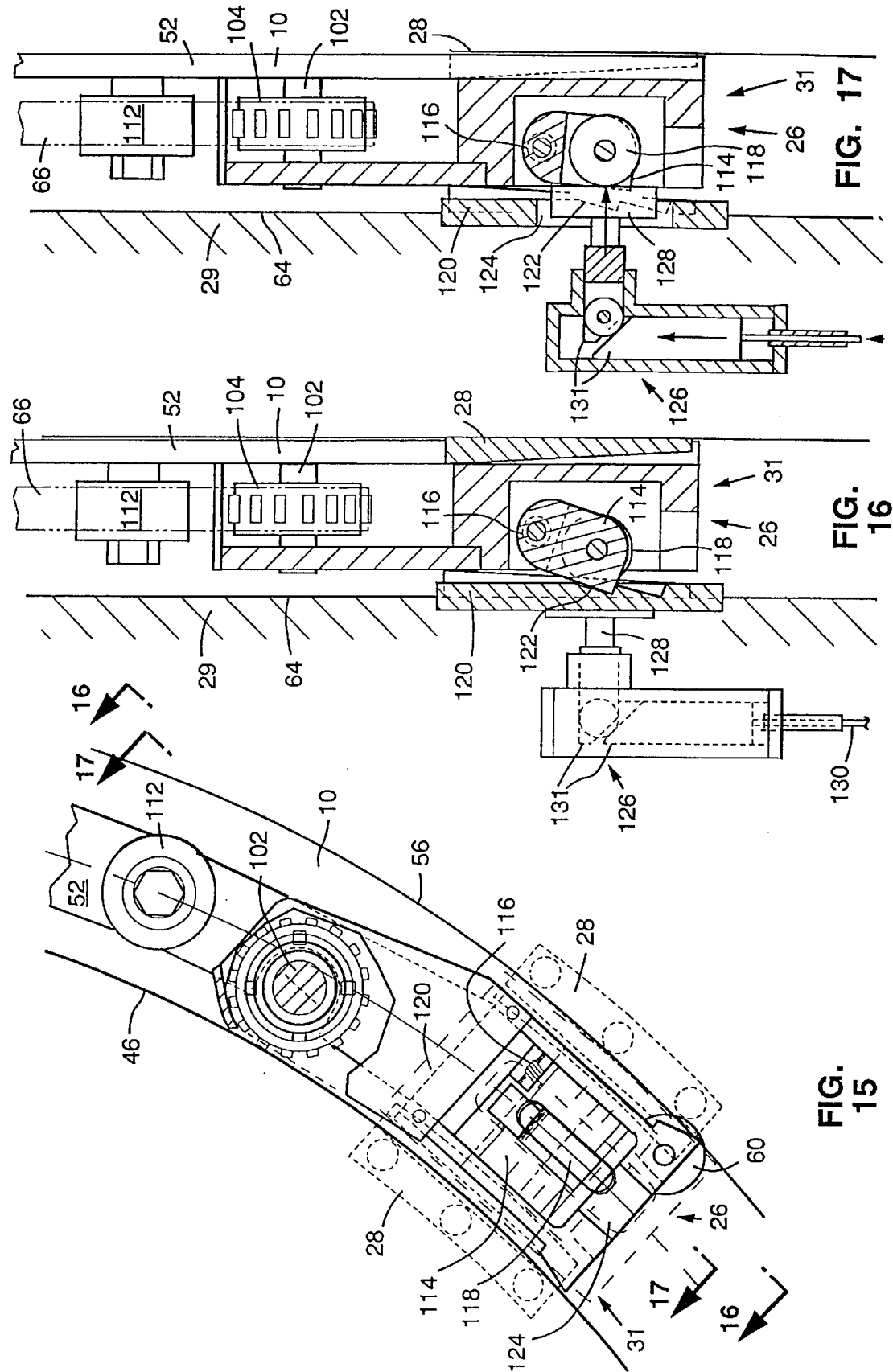

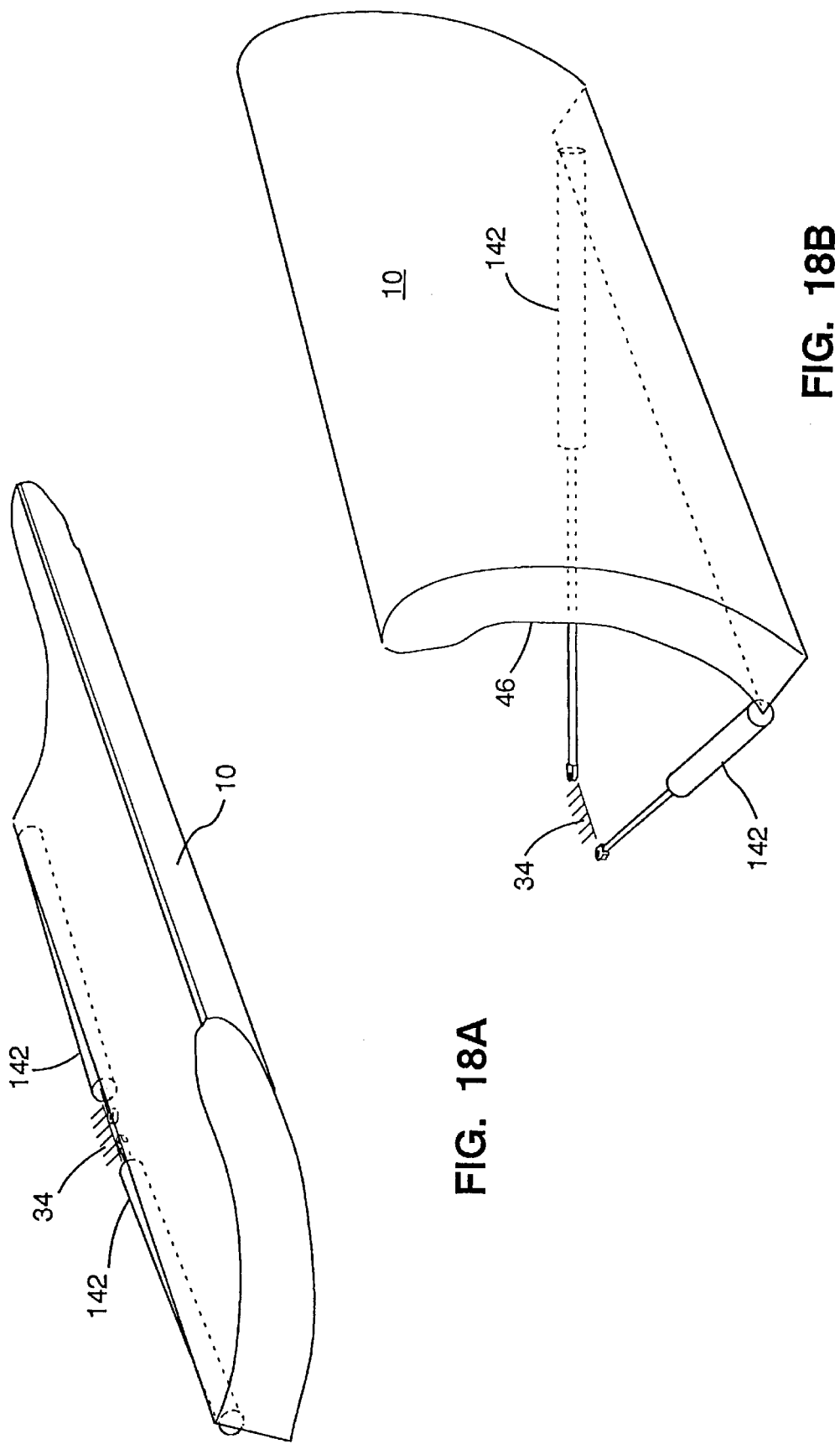

AUTOMOBILE DOOR AND SEAT ARMREST

This is a divisional of application Ser. No. 07/912,790, filed Jul. 13, 1992.

BACKGROUND OF THE INVENTION

1. Field of the Invention

The present invention relates to doors for wheeled vehicles, such as for sedans, vans, trucks, and other automobiles, and in particular to vertically sliding doors retractable in the automobile floor or roof.

2. Discussion of the Prior Art

Non-conventional door closures for automobiles have been experimented with for many years, showing up in non-production specialty cars and prototypes. Only recently, however, have practical vertically sliding doors been shown to be advantageous and feasible for existing standard automobile designs currently in high volume production. It is now known that vertically sliding doors may be designed into new cars without a large number of design constraints being imposed on the automobile designer. In fact, many of the difficult design constraints that now exist with conventional hinged automobile doors are eliminated by the use of vertically sliding doors. These inventive doors may be designed into existing body styles without any significant changes to the shape or appearance of the car. Both foreign and domestic automobile manufacturers are currently starting to explore the many economic advantages offered in safety, convenience, and ergonomics by this alternative to the standard hinged automobile door.

Two patents issued to the applicant, U.S. Pat. No. 4,801,172 and 4,940,282, explain the basic construction, features, and operation of the vertically sliding automobile door. In its preferred embodiment, the inventive door replaces conventional doors on a two or four door vehicle. The vertically sliding door has a window which retracts into the door in a standard fashion. However, the inventive door opens by retracting along an arcuate path under the floor rather than swinging outward from the vehicle as does a standard door. The inventive door and window are driven open and closed by one or more electric motors. When the door is driven into an elevated, closed position, structural keys on the door engage with receptacles in the chassis frame of the vehicle, and the door becomes a fully stressed structural member of the frame, providing a dramatic increase in the bending and torsional stiffness thereof. Preliminary analysis indicates an increase in bending stiffness of about nine times, and an increase in torsional stiffness of about two times compared with a chassis having conventional doors.

This structural integration of the door with the chassis frame provides numerous advantages. With this technology, vehicle frames can be designed with increased stiffness while being significantly lighter than their conventional frame counterparts. The same chassis frame can be used for different versions of a particular make of automobile. For instance, a convertible can have an identical lower structure as does a sedan, because the added stiffness provided by a roof is not relied upon by a vehicle design employing vertically sliding doors. Frontal and side impact resistance is also increased because vertically sliding doors provide a continuous structural frame around the passenger compartment, unlike conventional doors which may spring open or buckle inward in an accident.

To provide better aerodynamics, a more aesthetically pleasing profile, and an easier ingress and egress for passengers to the vehicle, today's vehicles are designed with higher tumblehome than before, top and bottom. Tumblehome is the amount a vehicle curves in towards the top or bottom from the widest point of the sides of the vehicle. An impediment to increasing lower tumblehome has traditionally been the large outer structural members of the car frame which run under the door sills. With the use of vertically sliding doors, these frame members can be reduced in size, moved toward the center of the vehicle, or preferably replaced altogether by the structural members of the new doors.

Other design constraints that are reduced or eliminated by vertically sliding doors include the constraints on the length of the doors. With conventional doors that swing out from the vehicle, the length of the door must be minimized to reduce its outward trajectory and cantilevered weight when opened. Vertically sliding doors can be lengthened up to the front and rear wheel wells, providing a wider door opening for easier ingress and egress to the front seats and also to the rear seats, if so equipped. A traditional four door car can utilize two long vertically sliding doors, providing access to the rear seats and eliminating the extra complexity, cost, and weight of the extra doors and door jambs. If four vertically sliding doors are preferred, automobile designers no longer are constrained with the need for providing roof columns between doors. Also, the constraint of the doors needing to be deeper than the height of the windows is removed with vertically sliding doors. Even with lower doors, and therefore taller windows, the windows can completely recess into the door, unlike many of today's car designs. This is because with vertically sliding doors, the windows may protrude through the bottom of the door when the windows are rolled down.

In addition to the increased tumblehome and door opening length described above, other features of the vertically sliding door make it easier to use than conventional car doors. The new doors are opened and closed automatically and are activated by a key chain remote control, a vehicle mounted keypad, or a traditional key and tumbler lock on the exterior of the car, and by electrical switches on the interior. A person with his or her arms full can enter the car simply by pushing a button. This inherent convenience of the vertical sliding door eliminates the awkward, unpredictable, and often dangerous opening and closing of doors while the vehicle is on a hill. Rather than dangerously swinging out into motor, bicycle or pedestrian traffic, the inventive door stows safely and conveniently under the vehicle with no obstruction to traffic. Because the side view mirrors stay stationary mounted to the side of the vehicle rather than swinging out with the doors, they can be used up until the moment the driver exits the car. Cars utilizing vertically sliding doors can be safely parked closer together or next to walls and other obstacles because there is no door to swing out and hit the adjacent object or get in the way of a person entering or exiting the car. A car also having a large amount of top and bottom tumblehome needs very little space next to it to allow easy ingress and egress.

Vertically sliding door technology also lends itself to the design of special vehicles for physically handicapped drivers. Because door operation is automatic, there is no problem in opening or closing the door for a person on crutches or in a wheelchair. The door does not swing out and limit the access of the door opening to a wheelchair, as do conventional doors. With the new doors, the unfolded wheelchair can even be loaded into the vehicle and secured in place of the standard driver's seat. An automatic lift can be used to lift the person and the wheelchair up and into the vehicle.

Other embodiments have been envisioned for the vertically sliding door concept. These configurations include vertically sliding side doors on vans, rear doors on vans and ambulances, tailgates on trucks, and door panels and or windows opening vertically and retracting above the roof of the vehicle in all of the above applications. Because vertically sliding door technology is relatively young, drawbacks exist in prior iterations and major improvements are continually being developed.

Structural members known as side intrusion beams are often used inside conventional doors to help protect passengers from injury during an impact to the side of the automobile. This type of beam traverses the door between the inner and outer door panels to inhibit the door from buckling inward in a side impact accident. However, to offer acceptable protection, these conventional beams must be of substantial cross section and therefore make the door heavier, impose space constraints on window and door mechanisms inside the door, and strongly influence overall door thickness. Vertically sliding doors are inherently stronger in a side impact because of their structural interlocking members, however side intrusion beams may still be beneficial across the center of the door to more fully protect passengers from an intrusion into the automobile during an accident.

SUMMARY OF THE INVENTION

The different aspects of the present invention which are outlined and described below represent various improvements found in the latest version of the vertically sliding door design described above.

In accordance with one aspect of the present invention, a belly pan is provided below the floor of the automobile that not only covers the doors when in the open, retracted position, but is of sufficient thickness to serve as a structural member of the automobile chassis frame. Preferably, the belly pan is connected to the floor along the longitudinal centerline of the vehicle by a box-like member for additional structural rigidity.

In accordance with another aspect of the present invention, longitudinally extending box-sections are provided on the side edges of the belly pan and serve as structural chassis members. These box-sections, or side sills, are located below the doors and are disposed laterally inward of the bottom of the door openings so as not to obstruct the ingress or egress of passengers through the door openings.

In accordance with yet another aspect of the present invention, a pivotally mounted door flap is provided to cover the top of a door when it is open and recessed in the gap between the floor and the belly pan of the vehicle. In this position, the rigid flap provides a covered threshold between the floor and the exterior of the bottom of the door opening. As the door is closed and emerges from under the floor, the flap is lifted, either by the top of the door or by other automatic means, and pivots upward and inward out of the path of the rising door. The flap may include rollers which ride along the interior panel of the door and prevent damage thereto, or other mechanisms may be employed to hold the flap away from the door. As the door moves back into an open (recessed) position, gravity or a spring biasing force returns the flap to a substantially horizontal position over the stowed door.

In accordance with yet another aspect of the present invention, a "floating" guide arrangement is provided in the door tracks. In the preferred embodiment of the invention, a pair of opposing, spring mounted rollers are pivotally mounted to the upper side portions of each end of the door. These rollers contact opposite sides of stationary door channels formed on each side of the door opening. The two pairs of opposing rollers bias the door toward the center of the door channels while allowing the door to move in and out enough for the door's upper keys to center on and properly engage their respective mating receptacles. A pair of similar rollers, one pivotally mounted near the top at each end of the door, allow the door to "float" fore and aft in a similar fashion.

In accordance with yet another aspect of the present invention, a perforated, flexible tape drive system is employed to raise and lower the door. In the preferred embodiment of the invention, a reversible electric motor (which may be used to also drive the door window) is mounted inside the door and drives a pair of sprockets, one sprocket rotatably mounted at each end of the door. A fixed length of perforated tape is routed past each sprocket with each end of both tapes rigidly attached inside the door channels at opposite ends of the door path. As the motor drives the two sprockets, the door alternately "climbs" or lowers itself along the flexible tapes. With this novel arrangement, both ends of the door may be lifted evenly, so as not to bind, and ensuring that the top door keys mate simultaneously and uniformly with their respective receptacles. This action is particularly important to the proper positioning and functioning of the structural keys when the door is able to float as described above.

In an alternate embodiment, the door motor may be mounted stationary relative to the chassis, such as when mounted between the floor and the belly pan. The two perforated tapes are then configured in continuous loops with each end of the door connected to one loop. With a sprocket for each loop driven by a common shaft, both sides of the door are lifted evenly. Both of the above-described door drive embodiments utilizing flexible, perforated tapes are simpler, lighter, less expensive, and allow for more door float than the curved rack and pinion type drives proposed in earlier designs.

In accordance with yet another aspect of the present invention, a reliable latch is provided at each end of the door. Previous designs of vertically sliding doors utilize solenoid operated, tapered pins carried by the door, selectively extensible into complementary engagement with tapered sockets to hold the door in an elevated, closed position. In comparison with the prior art, the new latch design is simpler, lighter, takes up less space (particularly longitudinal space forward and rearward of the door jambs), and is more forgiving in terms of door and frame distortion and misalignment while providing reliable latching and unlatching.

The new latching system includes two interconnected sets of latching mechanisms, one on the forward edge of the door, and one on the rear edge. In the preferred embodiment, one set of mechanisms consists of a pawl pivotally mounted to an edge of the door and spring biased outwardly therefrom. A fixed strike plate, located on the door jamb opposite the pawl when the door is in an elevated, closed position, includes at least one notch for complementary engagement of the pawl. When the door is raised into the closed position with the structural door keys firmly seated in their mating receptacles, the pawls are urged by spring force into latching engagement with the notches in their respective strike plates, thereby retaining both ends of the door in the closed position.

A plunger assembly for releasing the pawls is mounted behind each strike plate in the door jamb. When actuated in unison, electronically or manually, both plungers extend through recesses adjacent to the notches in the strike plates.

As the plungers become flush with the exposed surfaces of the strike plates, the pawls are disengaged from their mating notches and the door is free to be lowered, either manually or by the motor drive. Preferably, a roller is mounted near the tip of each pawl to reduce wear and provide for smoother latching and unlatching of the door.

A second set of notches may be located below the first set of notches to provide a second latching position for the door when it is almost closed. This latching position may be desirable in instances when the car frame is distorted and the door may not be able to fully close, such as when one wheel of the vehicle is elevated on a curb. In this instance, the door may move into and latch in the almost closed position (lower notches) to protect passengers and overcome any "door open" safety devices inhibiting the motion of the vehicle, thus allowing the vehicle to be driven off of the curb. The door is then able to automatically move into and latch in the fully closed position (upper notches) with the structural door keys fully engaged in their mating receptacles.

In accordance with yet another aspect of the present invention, a pair of interlocking structural keys is provided near the middle of both the forward and rear ends of the vertically sliding door. A side intrusion member horizontally spans the door between the two sets of interlocking keys and is structurally interconnected therewith to protect vehicle passengers by inhibiting the door from buckling inward during a side impact accident. Unlike conventional side intrusion beams which rely on their bending strength to protect passengers, the new side intrusion member of the present invention is secured at both its ends to the vehicle's chassis frame when the door is closed, and relies on the member's tensile strength to protect passengers from intrusion. For this reason, the new side intrusion member can provide greater protection while being substantially thinner and lighter than its prior art counter part.

In accordance with yet another aspect of the present invention, an armrest is provided on the outboard side of the driver and passenger seats adjacent to, but separate from, the vertically sliding doors. The armrest is pivotally mounted, preferably to the joining point between the lower and back portions of the seat, such that the armrest may be pivoted upward to a position substantially parallel to the seat back when the door is open and may be pivoted downward to a position-substantially horizontal when the door is closed. This pivoting motion may be manual or automatically synchronized with the opening and closing operation of the door. In one embodiment, the manual movement of the armrest provides the impetus for raising and lowering the door. For example, raising the armrest activates the door motor to open (lower) the door and lowering the armrest activates the motor to close (raise) the door. In another embodiment, the armrest can be utilized to manually ratchet the door up or down, while in a seated position, in the event of a loss of electrical power.

The outboard armrests, in accordance with the present invention, can also be used in novel ways as part of various passenger restraint systems. In one embodiment a safety air bag canister is housed in the armrest and is deployed between the passenger and the door in the event of a collision having a component of side impact. In another embodiment, the armrest can contain a bolster made of a progressively deformable material to cushion the passenger (preferably at the hip) from a side impact. In both the above embodiments, the armrest is attached to the seat at such a location as to allow the armrest to remain in an optimum position relative to the passenger, regardless of the adjustable seat position or inclination. Because of this consistent, optimal placement, a smaller air bag or deformable bolster can be used more effectively than a larger one mounted in the inside panel of a conventional door. The outboard arm rest can also be used as a safety belt presenter. The safety belt can be slidably and or releasably attached to the arm rest so that it is lowered into a visible and easily accessible position for fastening when the armrest is automatically or manually lowered.

In addition to applying to the more common vertically sliding doors that retract below the floor, almost all of the aspects of the present invention discussed above are applicable to the less common versions of vertically sliding doors as well. These versions include side and rear van doors that retract into the floor and or the roof, truck tailgates that retract below the bed, and driver and passenger doors whose windows and or doors retract into the roof. An alternate embodiment is disclosed herein in which the rear window of a van lowers into a rear door, which simultaneously raises into an open position stowed above the roof of the van.

BRIEF DESCRIPTION OF THE DRAWINGS

FIG. 13A is an enlarged front elevational cross-sectional view showing the top portion of the door, taken along line 13A—13A of FIG. 13B.

FIG. 13B is an enlarged cross-sectional view taken along line 13B—13B of FIG. 13A.

FIG. 14A is an enlarged front elevational cross-sectional view taken along line 14A—14A in FIG. 14B, showing a lower set of mating structural keys.

FIG. 14B is an enlarged cross-sectional view taken along line 14B—14B of FIG. 14A.

FIG. 15 is an enlarged front elevational view showing the botmom portion of the door.

FIG. 16 is a cross-sectional view taken along line 16—16 of FIG. 15 and showing the door in a latched position.

FIG. 17 is a cross-sectional view taken along line 17—17 of FIG. 15 and showing the plunger in an extended unlatching position.

FIG. 18A is a left front perspective view showing the door in a lowered open position.

FIG. 18B is a left front perspective view showing the door in a raised closed position.

DETAILED DESCRIPTION OF THE PREFERRED EMBODIMENTS

Although only the driver's door and door mechanisms are illustrated in FIGS. 1 through 22 and described below, the following inventive improvements also apply to the independently operated passenger door or doors and other vertically sliding door configurations as well.

Figure 1:
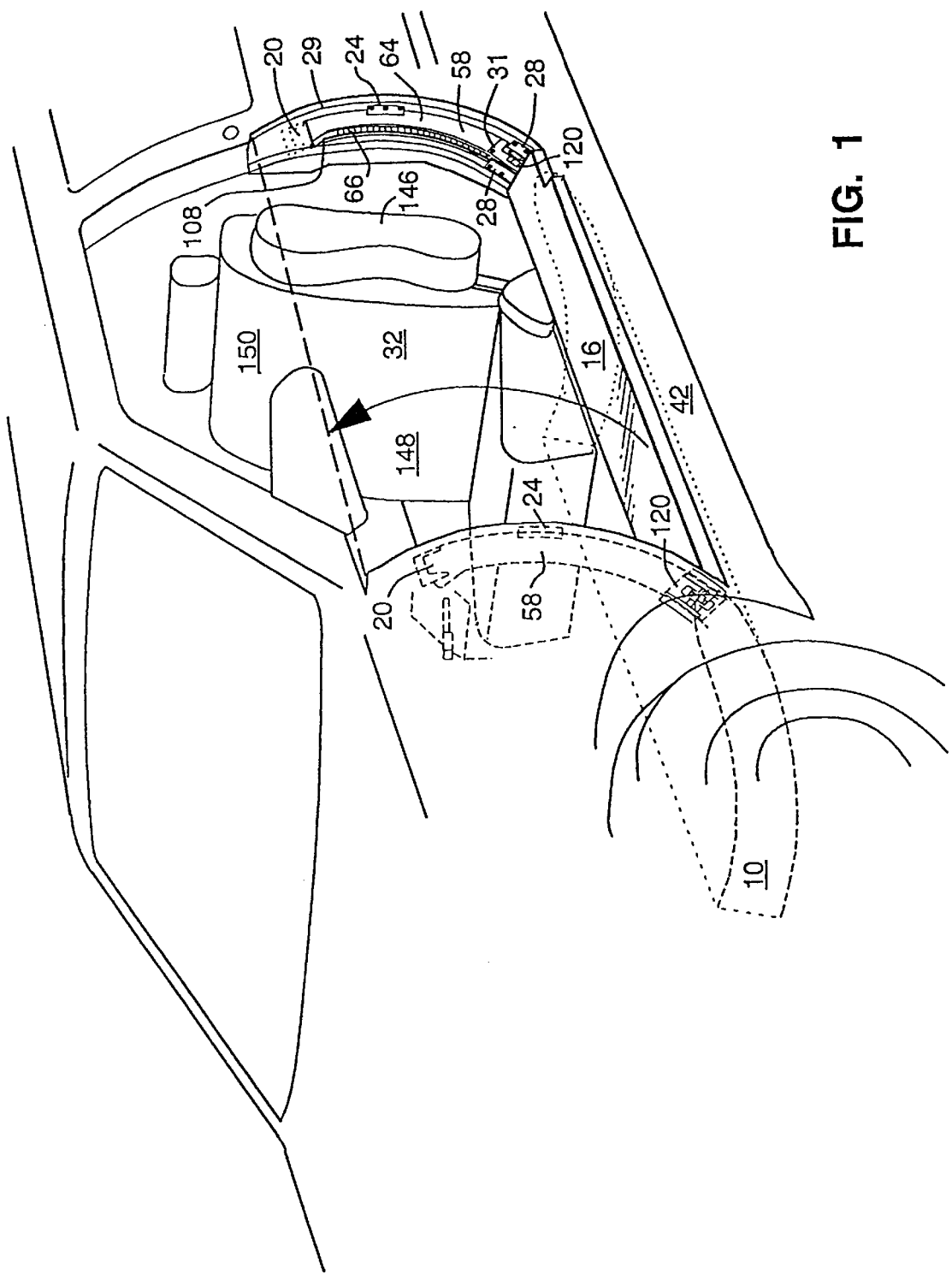
FIG. 1 is a left front elevational view of the vertically sliding door in an open retracted position (door depicted by dotted lines) with the upper extent of the door in a closed raised position shown by a dashed line.
Figure 2:
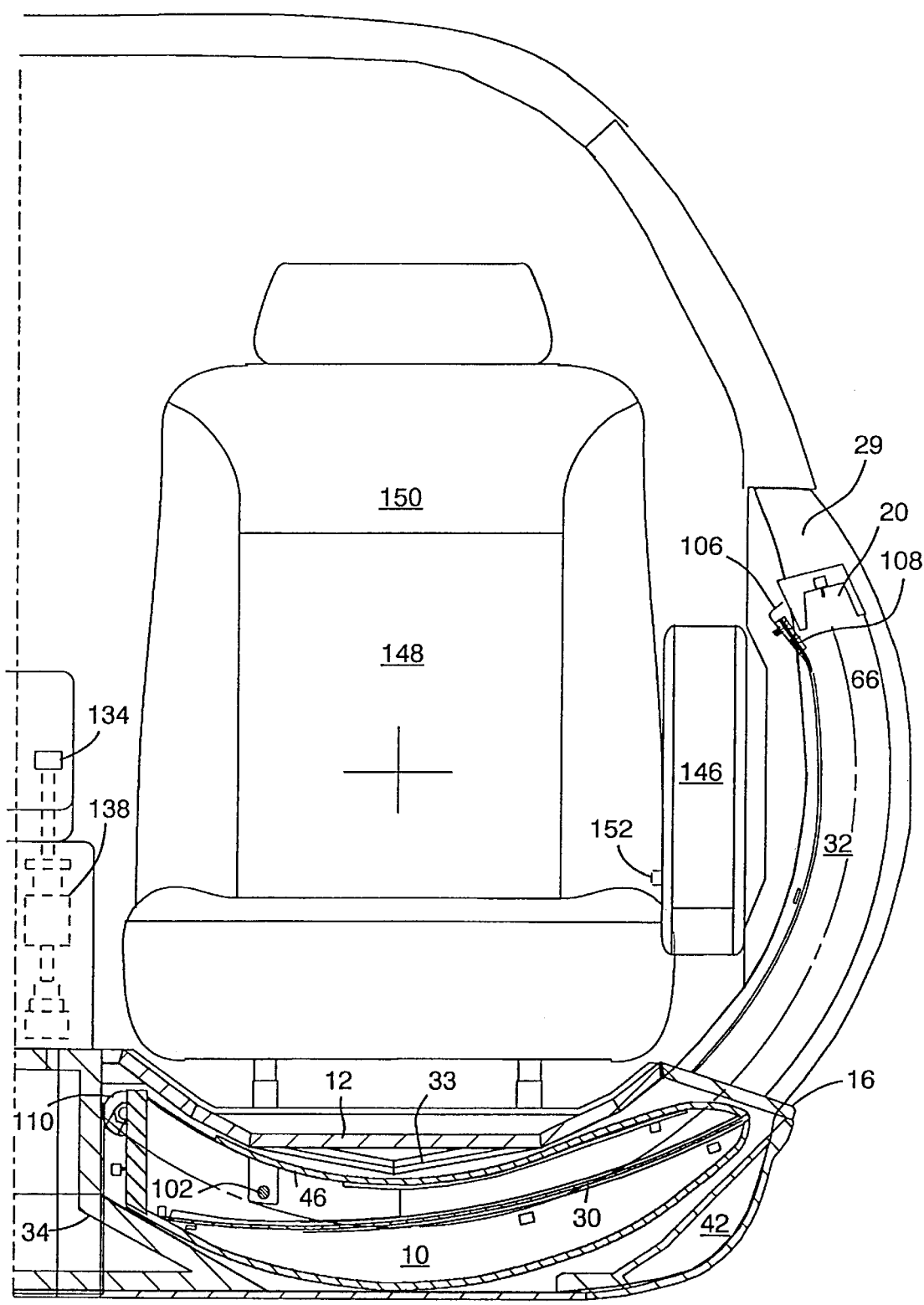
FIG. 2 is a front elevational cross-sectional view thereof.
Figure 3:
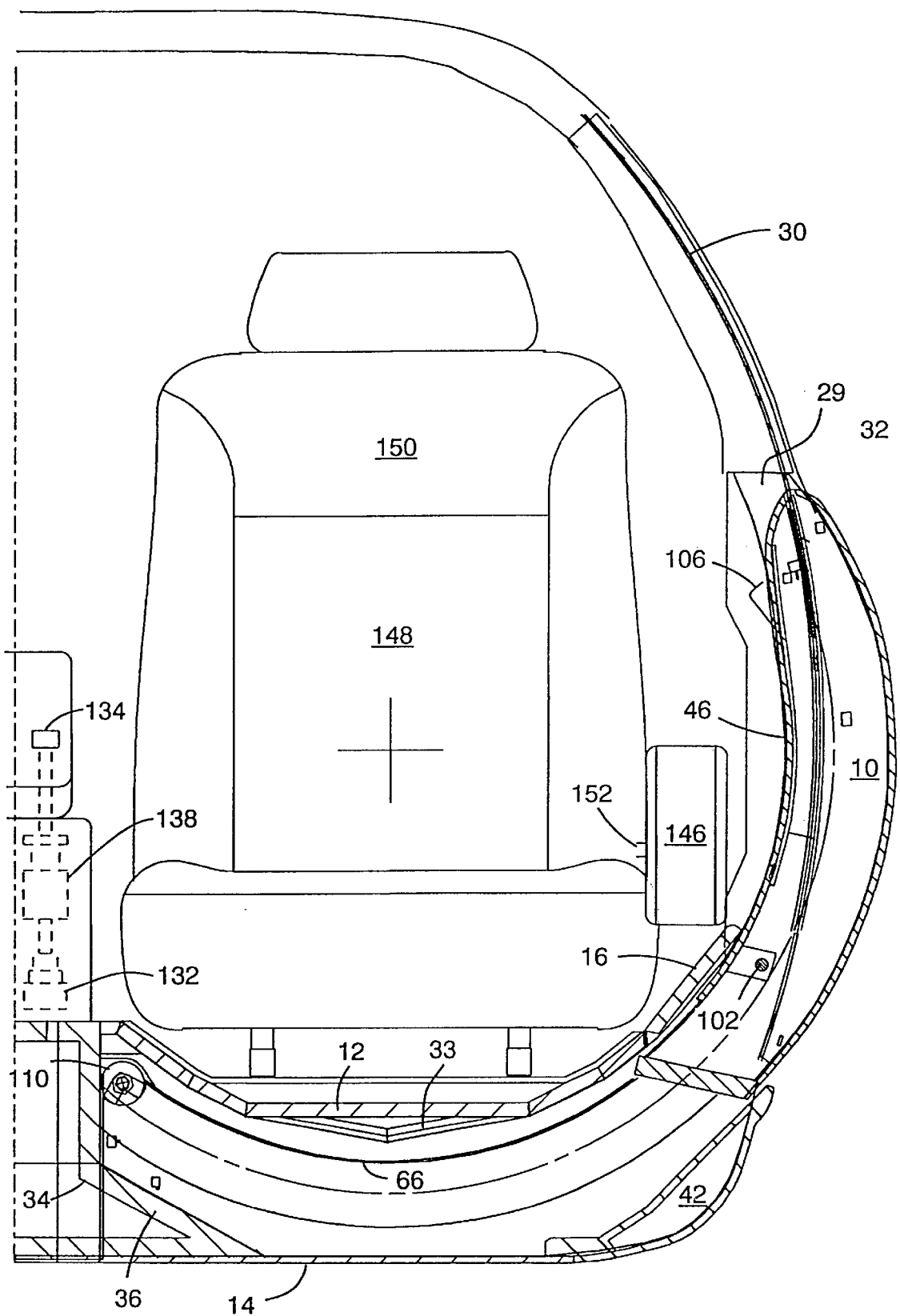
FIG. 3 is a front elevational cross-sectional view showing the door in a closed raised position.

In FIGS. 1 through 3, the left center portion of an automobile is shown having a vertically sliding door 10 movable between a lowered open position and a raised closed position. When lowered, door 10 is recessed between the floor 12 and the belly pan 14 and covered by flap 16. When door 10 is fully raised, upper structural key members 18 engage with upper mating receptacles 20, mid-door flange members 22 engage with mid-channel lip members 24, and lower structural key members 26 engage with lower mating receptacles 31. In this fully raised closed position, the door 10 forms a fully stressed structurally member, rigidly interlocking with and becoming an integral part of the chassis frame of the vehicle. Each of the four corners of the door is constrained from moving in any direction other than down. Door 10 is prevented from moving down by releasable latch pawls 114 at each end of door 10.

FIGS. 11 through 14 show structural members and mating receptacles 18, 20, 22, 24, 26, and 31 in greater detail. Upper key members 18 are frusto-pyramidical in shape with radiused side edges and are upwardly mounted near the top of door 10 at each end of door 10. Upper mating receptacles 20, mounted near the top of door jamb 29, are of a frusto-pyramidical shape for complementary engagement with upper key members 18 when door 10 is closed.

Mid-door flange members 22 outwardly protrude from the center portion of each end of door 10. Mid-channel lip members 24 inwardly protrude from the outboard center portion of each door jamb 29. When door 10 is elevated in a closed position, mid-door flange members 22 cooperatively align in an overlapping fashion with mid-channel lip 24, thereby preventing the ends of door 10 from separating from door jambs 29.

A lower key member 26 is located near the bottom of door 10 at each end of door 10. Lower key members 26 each have six upwardly and inwardly angled faces 27 which together form a discontinuous frusto-pyramidical shape, similar to that of upper key members 18. Portions of door jamb 29 at the bottom of door opening 32 have lower mating receptacles 31 for complemental engagement with lower key members 26 when door 10 is in an elevated, closed position.

Each lower mating receptacle is formed by a pair of opposing, beveled, and L-shaped lower channel lip members 28, and by a pair of beveled recesses on opposite sides of the face of strike plate 120.

Referring again to FIGS. 1 through 3, window 30 is housed in door 10 and extends therefrom as door 10 is raised to fill the upper portion of door opening 32. When door 10 is in a fully raised position, window 30 may be raised and lowered independently. As door 10 is lowered into an open position, window 30 retracts into door 10.

As disclosed in the prior art, U.S. Pat. No. 4,940,282, longitudinal bottom panels 33 are provided below floor 12 on either side of its longitudinal centerline to form box sections therewith of triangular configuration. These box sections provide much of the frame's stiffness when the doors are in the lowered position. In the prior art, the belly pan serves only to enclose and protect door 10 and associated components from the elements and road debris. However, by constructing the belly pan 14 from a suitable structural material, such as heavy gauge steel, and rigidly connecting it to other structural members, the belly pan 14 can serve as a fully stressed structural member of the chassis frame, adding significant additional resistance to bending and torsion. Removable access panels (not shown) may be designed into the belly pan 14 to allow access to doors 10 and associated components as long as the access panels do not undermine the structural integrity of the belly pan.

Figure 4:
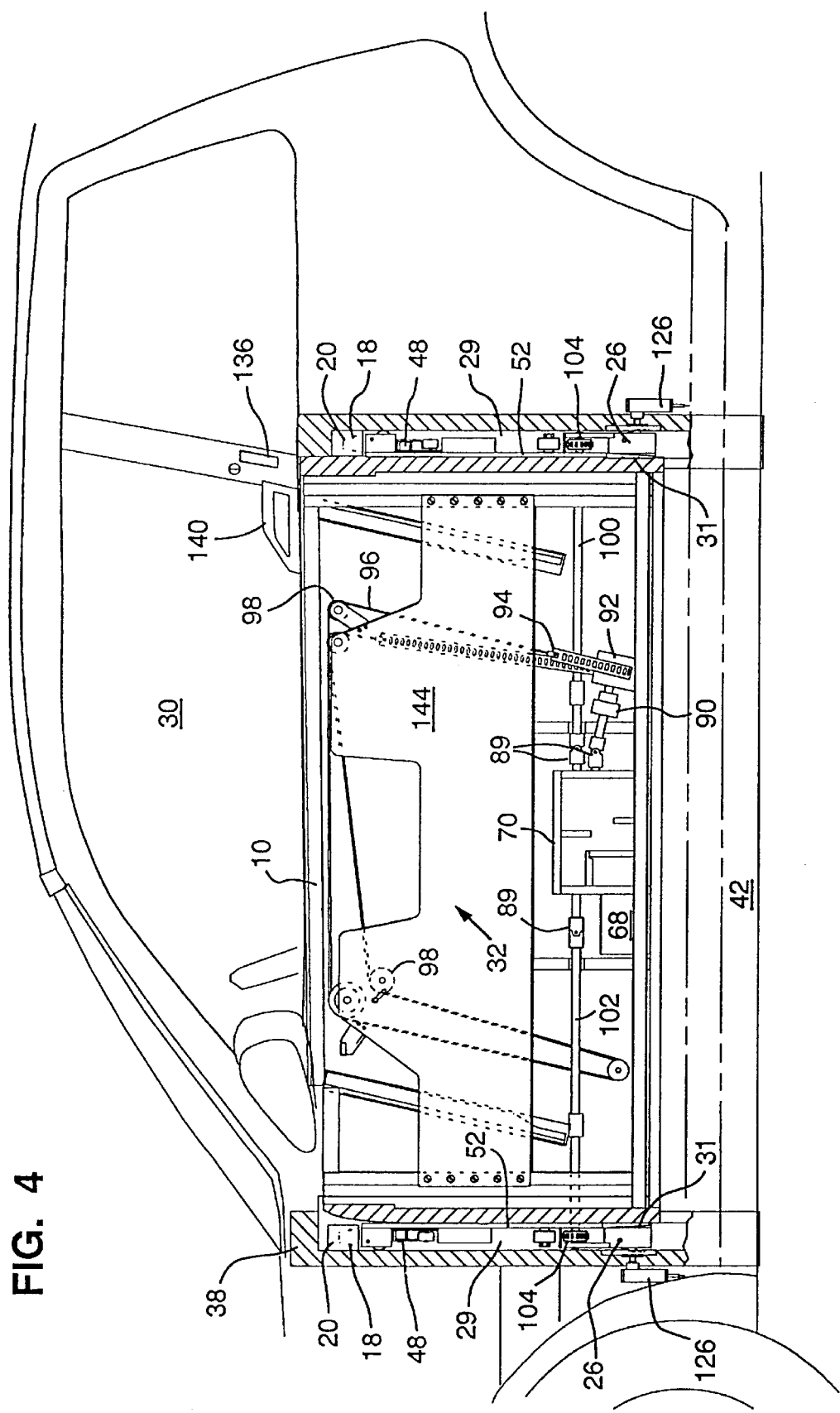
FIG. 4 is a left side elevational, partial sectional view.

It is desireable to provide a structural spacing member 34 between the longitudinal centerlines of the floor 12 and belly pan 14. The member may be a simple plate connecting the floor 12 and belly pan 14, but a spacing member 34 that has a closed box-like cross section with triangular portions 36, as shown in FIGS. 2 and 3, efficiently utilizes space not occupied by door 10 when in its retracted position. In the preferred embodiment, floor 12, belly pan 14, bottom panel 33, and spacing member 34 are rigidly connected to upstanding front and rear barrier sections 38 and 40, respectively, which are shown in FIG. 4 and also form part of the chassis frame.

Side sills 42 having longitudinally extending closed box-sections can be formed on the distal lateral edges of the belly pan 14 to further increase the rigidity of the chassis frame and or allow other structural members to be reduced in size and weight. Side sills 42 are disposed laterally inward from the bottom of the door openings 32 so as not to impede the easy ingress or egress of passengers through the door openings 32, which is facilitated by the narrow width of floor 12. Side sills 42 are rigidly connected to the front and rear barrier sections 38 and 40, respectfully.

Door flaps 16 are pivotally connected to the laterally outward edges of the floor 12 and cover the upper portions of doors 10 when they are recessed between the floor 12 and belly pan 14. In this lowered position, the flap 16 is rigid enough to support the weight of a person standing on it. The flap 16 seals the gap between the outer edges of floor 12 and belly pan 14 to prevent the entry of debris. However, drainage holes (not shown) should be provided at the bottom of belly pan 14 to prevent any accumulation of water. The flap 16 is pivoted upward and inward, either by an actuation mechanism or by the top of door 10, as door 10 is raised from an open, recessed position to a closed, elevated position. To prevent excessive wear from the flap 16 sliding on the inside door panel 46, flap 16 can be held away from the inside door panel 46 by rollers (not shown) mounted on the flap 16 and contacting panel 46, or by the actuation mechanism mentioned above. The flap 16 can be spring biased towards the closed position, or be allowed to close by gravity.

Referring now to FIGS. 4, 5, 13, and 14, the improved vertically sliding door 10 is provided with means to allow it to float both radially in and out and longitudinally fore and aft. This arrangement allows the door 10 to be guided when opened or closed, but allows the structural keys 18, 22, and 26 to align and fully mate with complementary engaging receptacles 20, 24, and 31, respectively. Radial in and out float is controlled by two pairs of opposing rollers 48, one pair located at each upper end of door 10. Each roller 48 is mounted on a roller arm 50 which is pivotally mounted to a door end support frame 52. Roller arms 50 are inwardly or outwardly biased by springs 54 so that rollers 48 contact and roll along opposite sides 56 of door jamb channels 58. Springs 54 are designed to be stiff enough to bias door 10 towards the center of door jamb channels 58, but forgiving enough to allow structural keys to seat in their receptacles properly upon door closing. Two single rollers 60 rotatably mounted directly to the door end support frames 52 are sufficient to radially guide the lower end of door 10 by rolling against the outer side 56 of the door jamb channels 58.

The longitudinal, fore and aft play of the door 10 is controlled in a similar fashion by two outwardly spring biased upper rollers 62 which ride on the back surfaces 64 of door jamb channels 58. The compliant longitudinal centering of the bottom of door 10 is mainly accomplished by the tension of the door drive tapes 66, discussed later below.

The features of the improved door and window drive mechanisms are shown in FIGS. 4 through 10. Although the door 10 and window 30 may be operated independently, they are both powered by the same reversible electric motor 68 and transmission unit 70 mounted inside the bottom of the door 10. A common input shaft 72 delivers rotational power from the motor 68 to two electrically engageable clutches 74 and 76, one for the door drive and one for the window drive, respectively. When energized, either separately or in unison, clutches 74 and 76 transmit power through reducing gear sets 78 and 80, respectively, to output shafts 82 and 84, respectively. Thus, when motor 68 and door clutch 74 are energized, door output shaft 82 is powered. Likewise, when motor 68 and window clutch 76 are energized, window output shaft 84 is powered.

The door and window gear trains 78 and 80, respectively, can be coupled together or uncoupled by a sliding collar 86, which is operated by a solenoid driven shift fork 88 (decoupling solenoid not shown). During normally powered operation the decoupling solenoid is energized, causing the door and window drive systems to be decoupled and allowing their independent operation. The door and window are coupled when the solenoid is de-energized, such as when the vehicle is parked and the door 10 is in a closed and latched position, thus preventing window 30 from being forced open. The door and window will also be coupled during a loss of electrical power, causing the window 30 to retract when door 10 is manually released and pushed down into an open position, and causing window 30 to close when door 10 is manually raised. This coupling allows door 10 and window 30 to be opened or closed together in one movement.

An electronic controller, not shown, controls the door and window operation by receiving inputs from door and window operation switches and sensors, and providing the proper sequence of outputs to power the motor 68, clutches 74 and 76, and solenoids.

To raise door 10 from a fully open position to a fully closed position, the controller energizes the decoupling solenoid, engages door clutch 74, and activates motor 68 in the "up direction". After door 10 is about half way up, the controller engages window clutch 76 to start raising window 30. When door 10 reaches a fully closed position, door clutch 74 is disengaged. Likewise, when window 30 reaches a fully closed position, window clutch 76 is disengaged and motor 68 is turned off. Once door 10 is in a fully closed position, window 30 may be partially or fully lowered and raised.

Lowering door 10 into an open position is a reverse of the above sequence. The decoupling solenoid is energized, door 10 is unlatched (as described in detail later), window clutch 76 is engaged, and motor 68 is activated in the "down direction". After window 30 is about half way down, door clutch 74 is engaged to start lowering door 10. When window 30 is fully retracted, window clutch 76 is disengaged. Likewise, when door 10 is in a fully retracted, open position, door clutch 74 is disengaged and motor 68 is turned off. Independent window operation is inhibited when door 10 is not in a closed position.

A universal joint shaft coupling 89 is provided on window output shaft 84 to allow the shaft to diverge from door output shaft 82. A slip clutch 90 is located between shaft coupling 89 and window drive assembly 92 to prevent body parts from being trapped by the closing window 30, or minimize damage if trapping does occur. Slip clutch 90 also allows door 10 to be manually fully lowered in the event of an electrical power failure when window 30 is already lowered.

Power to drive window 30 is transmitted from the window output shaft 84 through slip clutch 90 to the window drive unit 92. Window tape drive unit 92 utilizes flexible tape drive technology to transfer its rotary input into an almost vertical displacement output. A tape drive sprocket (not shown) is rotatably mounted inside drive unit 92 and connected to slip clutch 90 by a shaft. The sprocket engages a length of flexible, perforated tape 94, such as DYMETROL™ Mechanical Drive Tape, Model No. DETP-2005, manufactured by Du Pont Company, Finishes & Fabricated Products Dept., Wilmington, Del. A continuous window cable 96 is attached to each end of tape 94, forming a continuous loop therewith. Window cable 96 is routed along a series of pulleys 98 to drive a standard window mechanism up and down as window output shaft 84 is turned.

Power to drive door 10 is transmitted from both ends of door output shaft 82 through two universal joint shaft couplings 89 (to allow for any shaft misalignment) to two drive shafts 100 and 102 on opposite sides of transmission 70. Drive shafts 100 and 102 each extend through opposite ends of door 10 where flexible tape drive sprockets 104 are mounted on the ends of the shafts 100 and 102.

Figure 6:
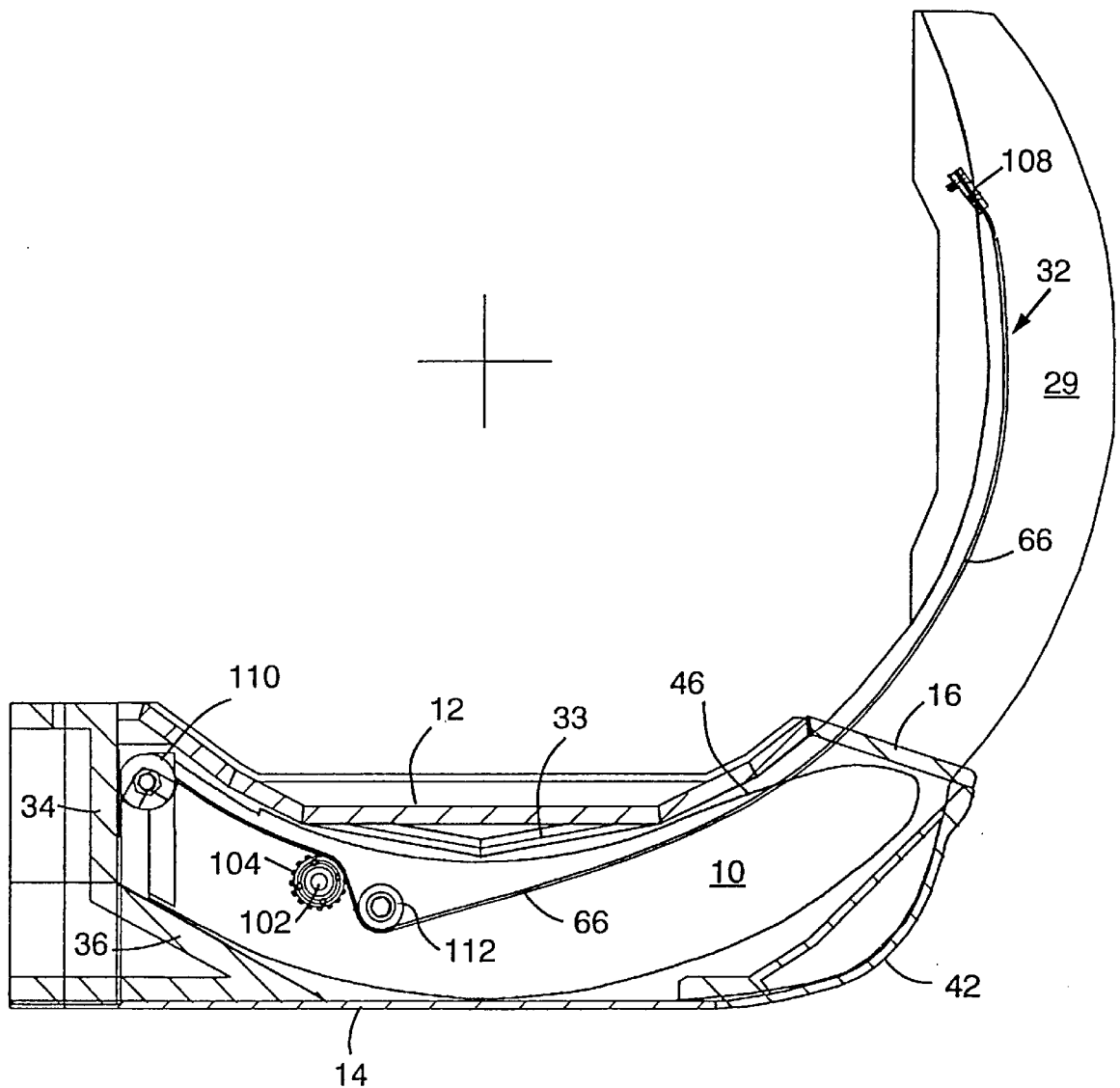
FIG. 6 is a front elevational cross-sectional view showing the tape drive with the door in a closed lowered position.
Figure 7:
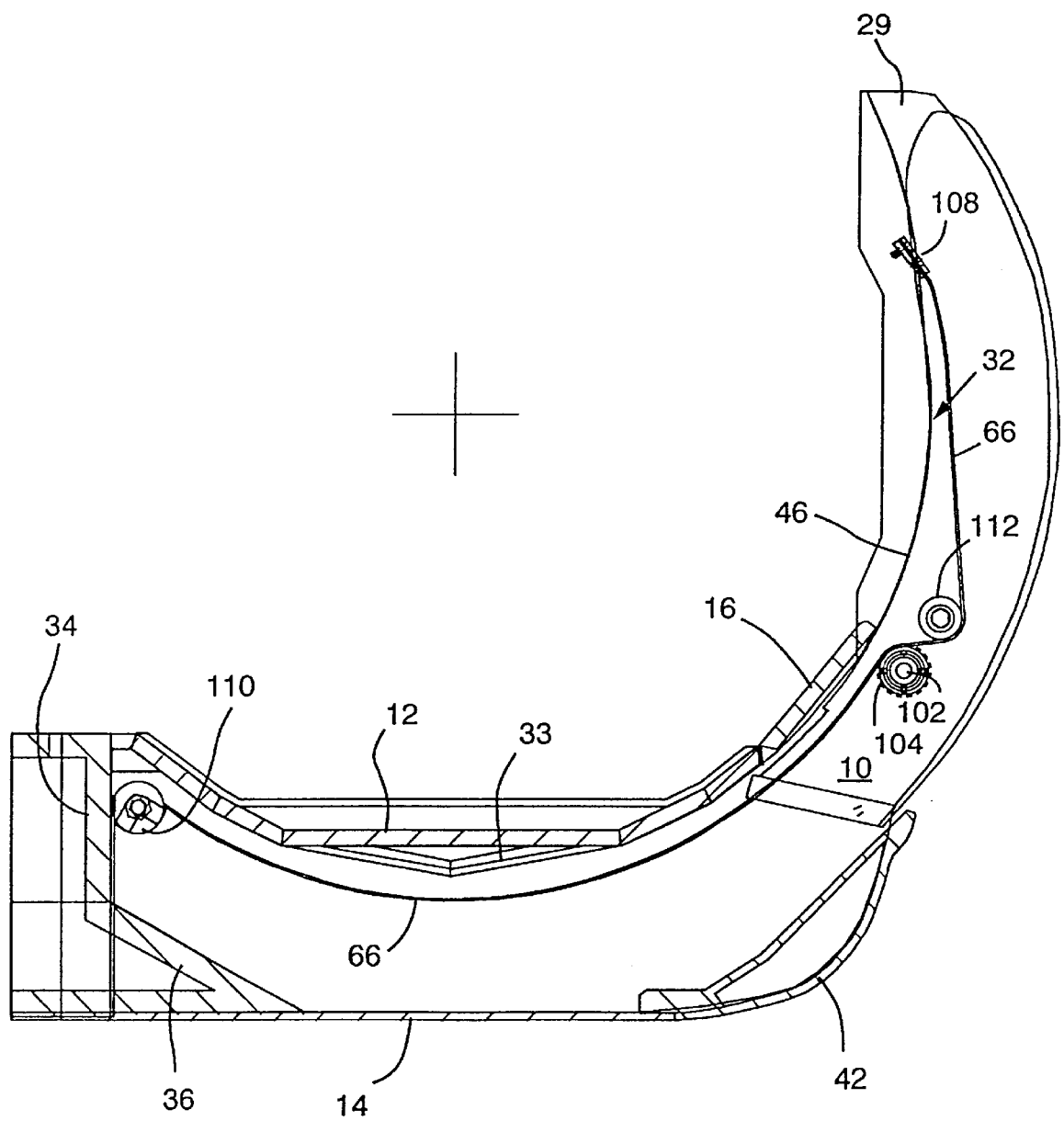
FIG. 7 is a front elevational cross-sectional view showing the tape drive with the door in an open raised position.
Figures 8, 9, 10:
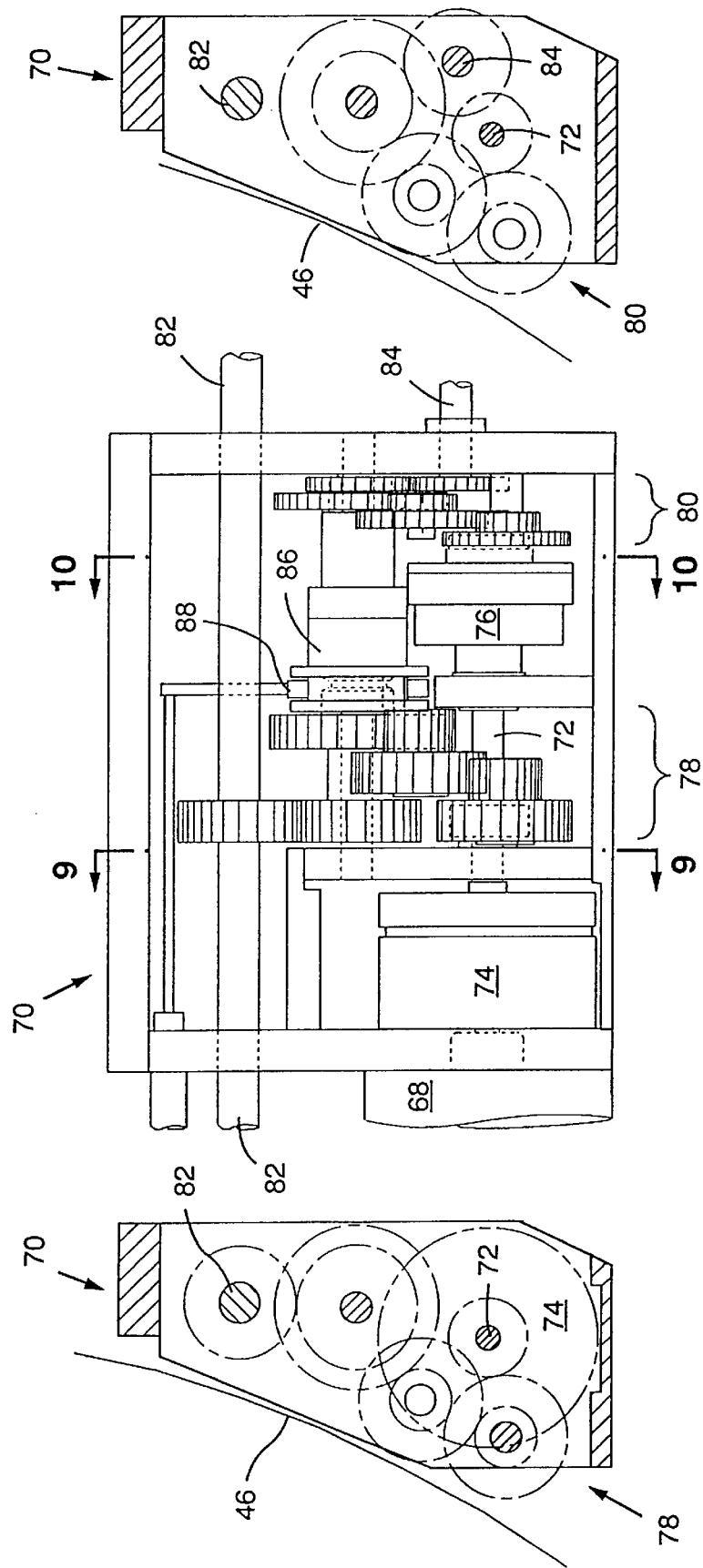
FIG. 8 is a left side elevational view of the combined window and door drive transmission (of passenger door).
FIG. 9 is cross-sectional view taken along line 9—9 of FIG. 8.
FIG. 10 is cross-sectional view taken along line 10—10 of FIG. 8.
Figure 11:
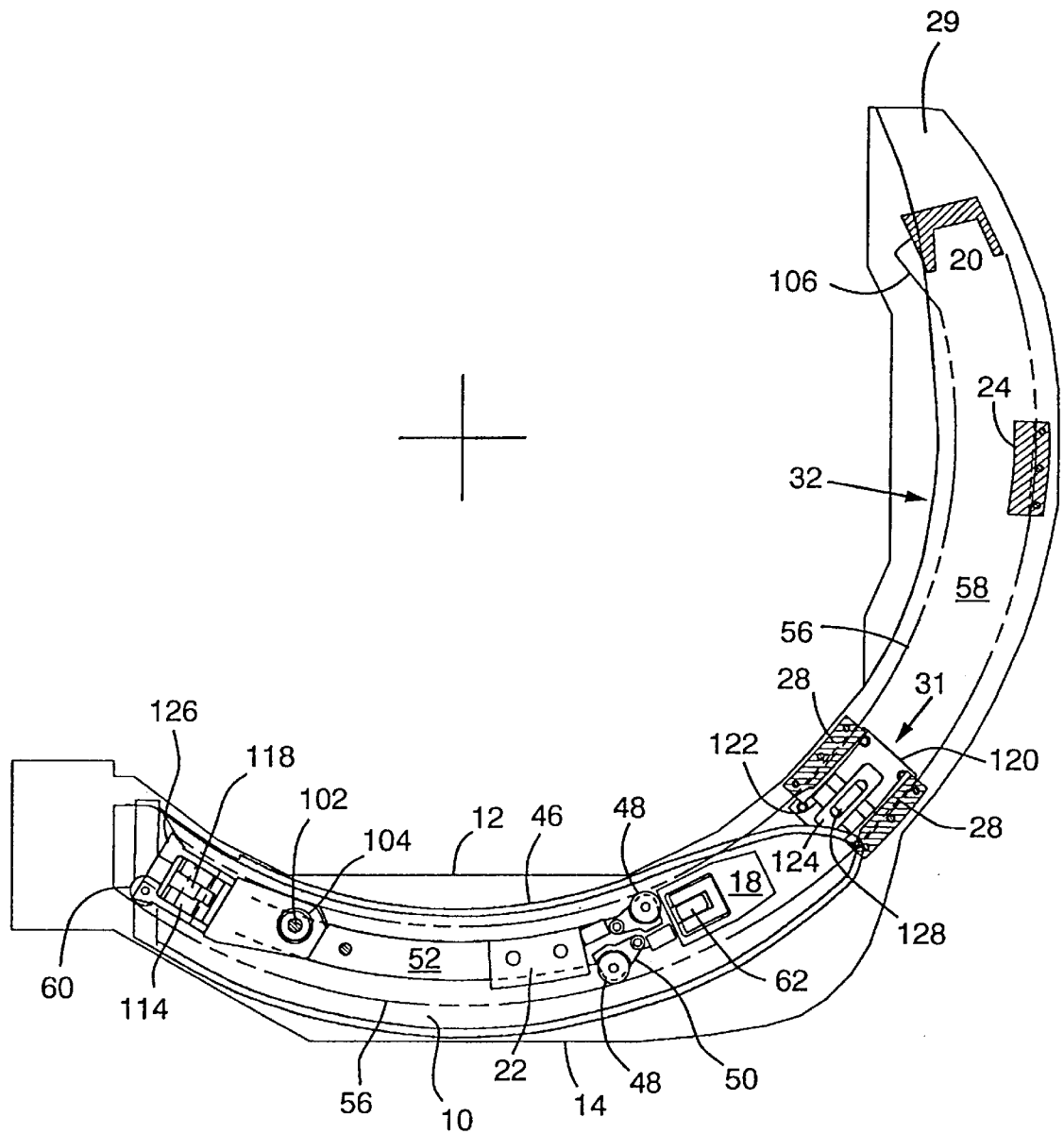
FIG. 11 is a front elevational view of the door in a lowered open position showing the structural keys and mating receptacles.
Figure 12:
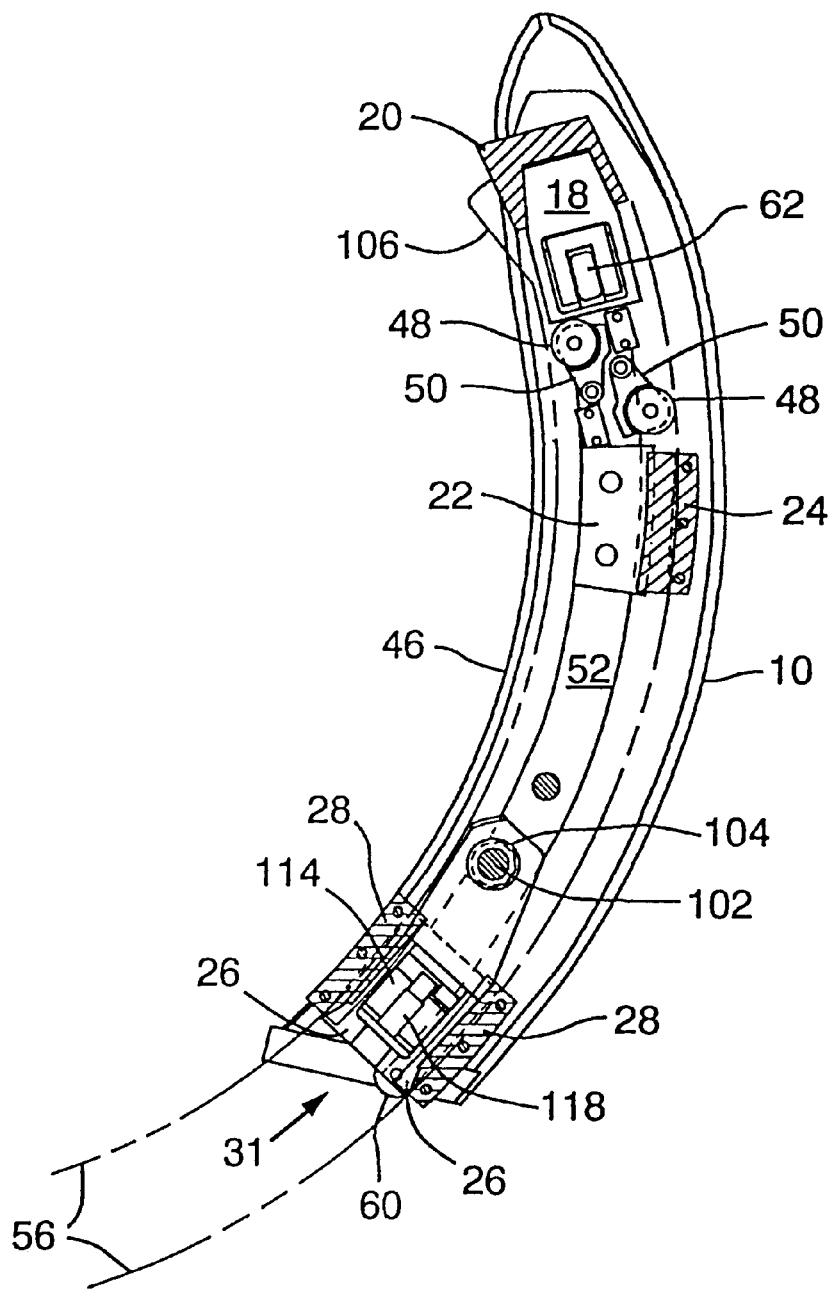
FIG. 12 is a front elevational view of the door in a raised closed position showing the structural keys interlocking with their respective receptacles.
Figures 19, 20:
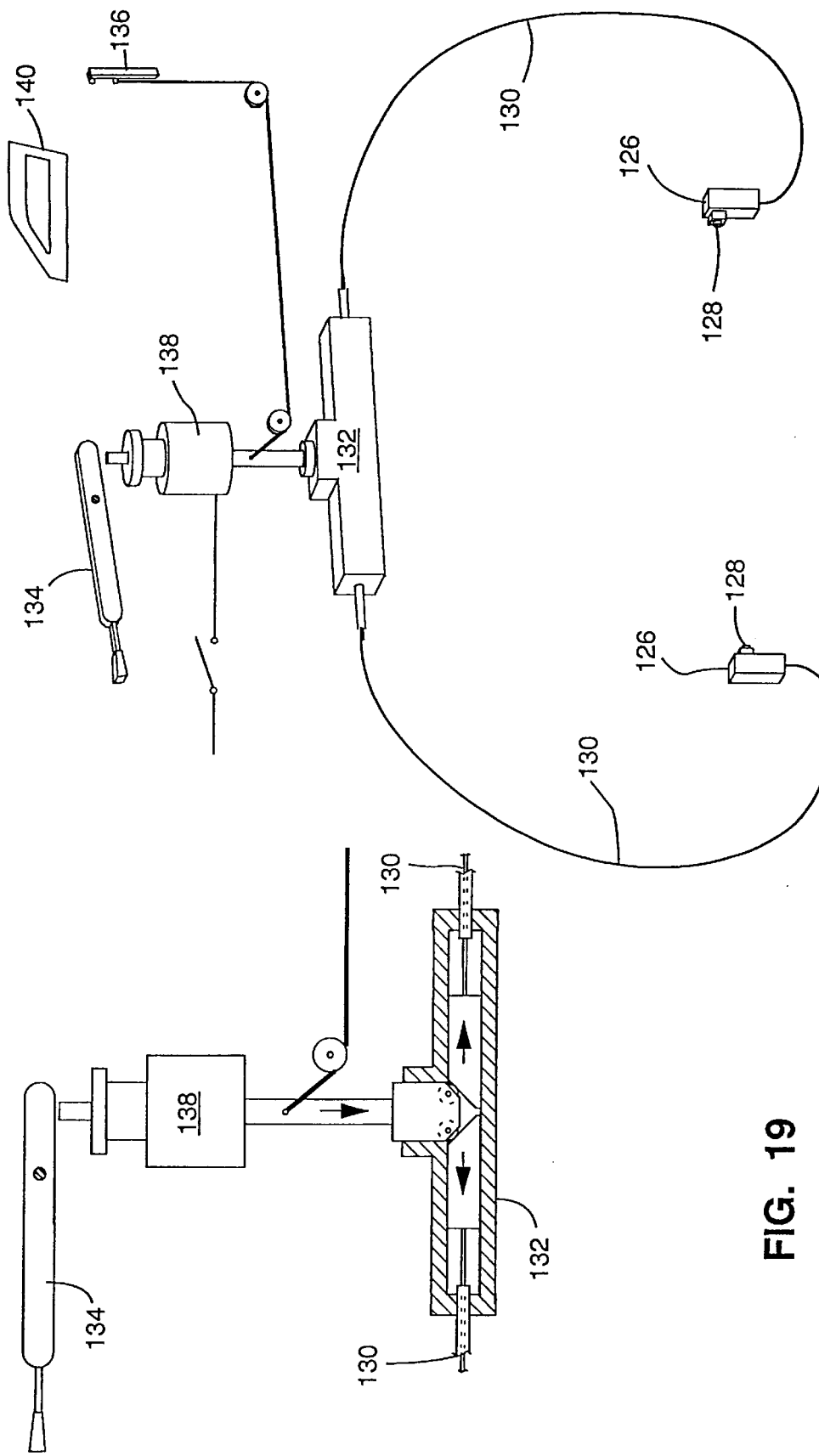
FIG. 19 is a partially cross-sectioned side elevational view of the door release mechanism.
FIG. 20 is a pictorial view illustrating the door release system.

Sprockets 104 each engage a fixed length of flexible, perforated tape 66 which are rigidly fixed to the body structure of the vehicle. The prototype of the present invention uses perforated tapes 66 for the door that are of the same brand and style as the tape 94 used to drive window 30, but are custom manufactured with a greater thickness to support the weight of door 10. The upper ends of tapes 66 are rigidly fastened to recesses 106 in door jamb channels 58 by mounting clamps 108. The lower ends of tapes 66 are adjustably fastened to the spacing member 34 by simple tensioning devices 110. In the prototype, tensioning devices 110 are fashioned from sprockets similar to sprockets 104, which are turned and then tightened when all the slack is removed from the tapes 66 and a slight tension is achieved. As mentioned previously, tapes 66 tend to center the bottom of door 10 fore and aft between door jamb channels 58. An idler wheel 112 on each tape 66 guides the tapes 66 around sprockets 104, providing a larger angle of wrap for greater engagement. FIGS. 6 and 7 illustrate the tape paths and how sprockets 104 are able to climb up tapes 66 to raise the door 10 into a closed position, and rotate in the opposite direction to lower door 10 into an open position.

In an alternate embodiment, not shown, the door motor 68 and sprockets 104 can be located on a stationary member, such as spacing member 34, with tapes 66 forming two continuous loops, one loop attached to each end of door 10 and engaging one of the sprockets 104. This configuration allows both ends of door 10 to be driven evenly. However, window 30 would be driven by a separate, door mounted motor or would need a different scheme for linking it with the door operation than that described above.

FIGS. 4, 5, 11, 12, 15—17, 19, and 20 illustrate the inventive latching and unlatching systems of the improved vertically sliding door. A latch pawl 114 is pivotally mounted in a recess located at the lower portion of door end support frame 52 at each end of the door. Torsion springs 116 bias latch pawls 114 outwardly from support frames 52 toward door jamb channels 58. Each of the two latch pawls 114 is slotted to accommodate a roller 118 rotatably mounted therein and protruding slightly therefrom. As door 10 is raised into a closed position, each roller 118 rolls across the face of a strike plate 120 located in and flush with door jamb channel 58. Each strike plate 120 has at least one notch 122 horizontally across its face for engaging the end of latch pawl 114. When roller 118 encounters recess 124 in strike plate 120, torsion spring 116 urges latch pawl 114 outward into notch 122, thereby preventing door 10 from lowering from its elevated, closed position.

In the preferred embodiment of the invention, each strike plate 120 has two notches 122, one about ⅝ inches below the other. The upper notch 122 engages pawl 114 when door 10 is in a fully closed position and structural keys 18, 22, and 26 are fully engaged in their mating receptacles 20, 24, and 31, respectively. The lower notch 122 engages pawl 114 when misalignment of door parts prevents motor 68 from driving door 10 into its fully closed position. This could occur when the vehicle frame is subjected to abnormal forces when door 10 is open, such as when only one wheel is elevated on a curb. In such a situation, door 10 would be closed almost completely and would latch in the lower position, allowing the driver of the vehicle to proceed driving. As soon as the abnormal stresses are removed from the vehicle, the door controller unit would automatically raise door 10 completely, thereby allowing pawl 114 to engage the upper notch 122, and allowing the structural keys to become fully interlocked with their mating members.

To release pawls 114 from notches 122 (either upper or lower), a cable driven release mechanism 126 is located behind each strike plate 120 in each door jamb 29. Each release mechanism includes a plunger 128 which, when activated by cable 130 through cross slides 131, protrudes through strike plate recess 124 and urges roller 116 back towards door 10, thereby disengaging pawl 114 from notch 122 and allowing door 10 to lower from the closed position.

Release mechanisms 126 are operated through cables 130 by a master actuator 132. In the preferred embodiment, master actuator 132 is in turn operated by either an interior manual lever 134, an exterior manual lever 136, or a solenoid 138. During normal door operation, the electronic door controller operates solenoid 138 to release door 10 during a door opening sequence, as described above. In the event of an electrical power failure or other malfunction, interior manual lever 134 or key-locked exterior manual lever 136 is used to unlatch door 10, permitting it to be manually pushed down into the open position.

With either manual or automatic door operation, door 10 is lowered into the fully open position before re-closing door 10, so that single rollers 60 can "reset" release mechanisms 126 by contacting and pushing in plungers 128. A handle 140 is provided on the top of door 10 outside of window 30 to allow for the manual closing of door 10. Because the drive train of window 30 is coupled to the drive train of door 10 in the manual mode as described above, window 30 also closes as handle 140 is lifted. Air springs 142 are attached between door 10 and a structural member below floor 12, such as spacing member 34, to at least partially offset the weight of door 10 (about 85 pounds in the prototype). This balancing of door 10 allows it to be more easily closed manually, and prevents door 10 from slamming into the open position beneath the floor 12 when unlatched.

Figure 5:
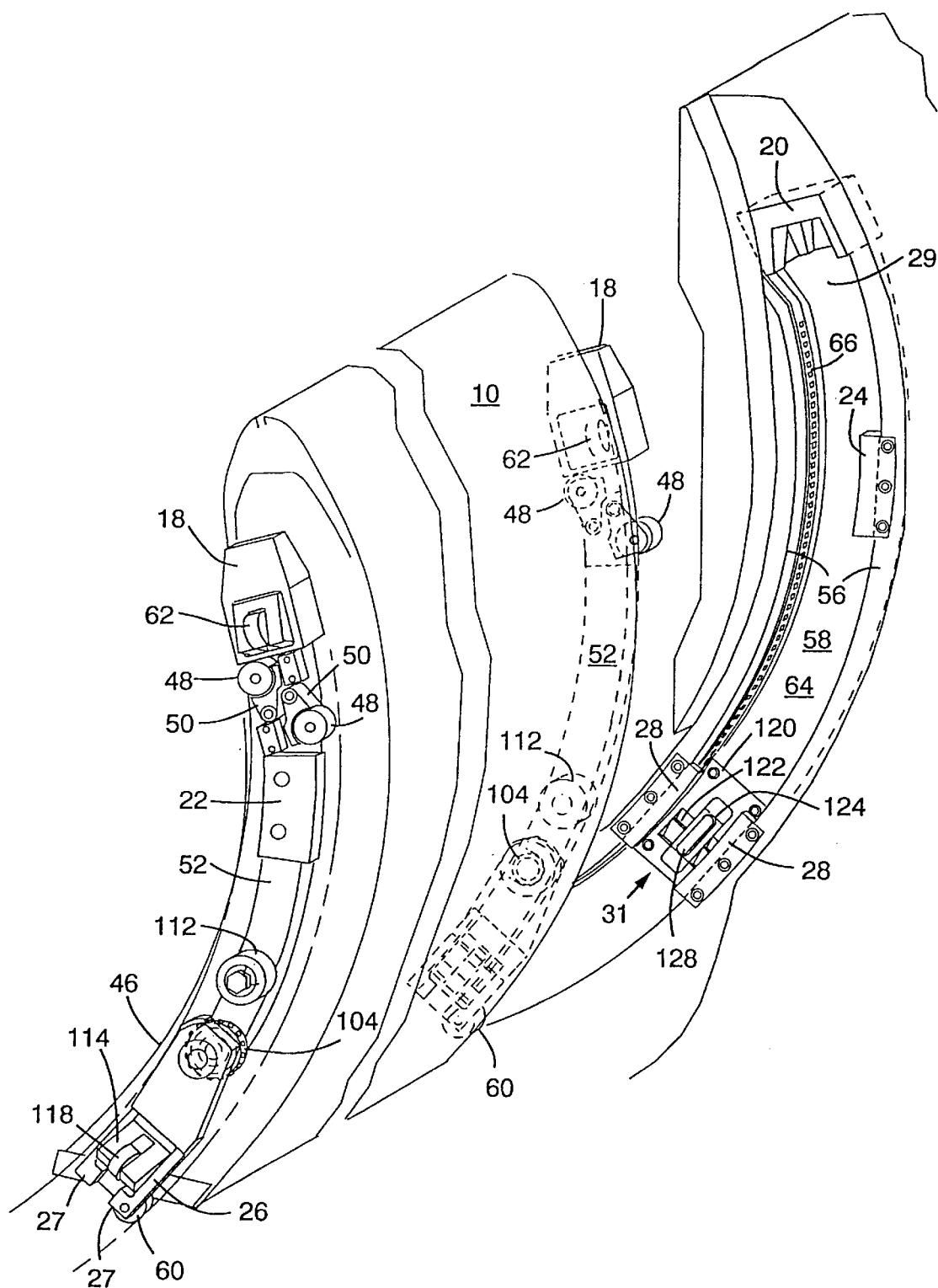
FIG. 5 is a partial fragmentary perspective view of the door and one mating door jamb.

Referring now to FIGS. 4 and 5, side intrusion member 144 horizontally spans door 10 across its midsection. When door 10 is closed, both mid-door flange members 22 engage a mid-channel lip member 24. This structurally anchors both ends of side intrusion member 144 into the main chassis frame and eliminates door opening 32 in the frame from a structural point of view. Unlike conventional hinged doors with side intrusion beams, the improved vertically sliding door 10 performs in a side impact accident as if a continuous structural member spanned the side of the car. Furthermore, because the vertically sliding door 10 on the opposite side of the vehicle from the direction of impact also has an identical side intrusion member 144, the entire passenger enclosure portion of the chassis frame is additionally protected from deformation when opposite member 144 goes into tension, rather than popping open and apart as a conventional door might, which would cause additional intrusion on the side incurring the impact. Novel side intrusion members 144 can provide greater protection from intrusion while being thinner and lighter than conventional side intrusion beams. This is due to members 144 being tied into the chassis frame of the vehicle and being able to inhibit intrusion by going into tension, unlike conventional side intrusion beams which inhibit intrusion through their bending strength (increased cross sectional thickness). In an alternate embodiment (not shown), it is envisioned that plate-like member 144 could be replaced by one or more cables.

Figure 21:
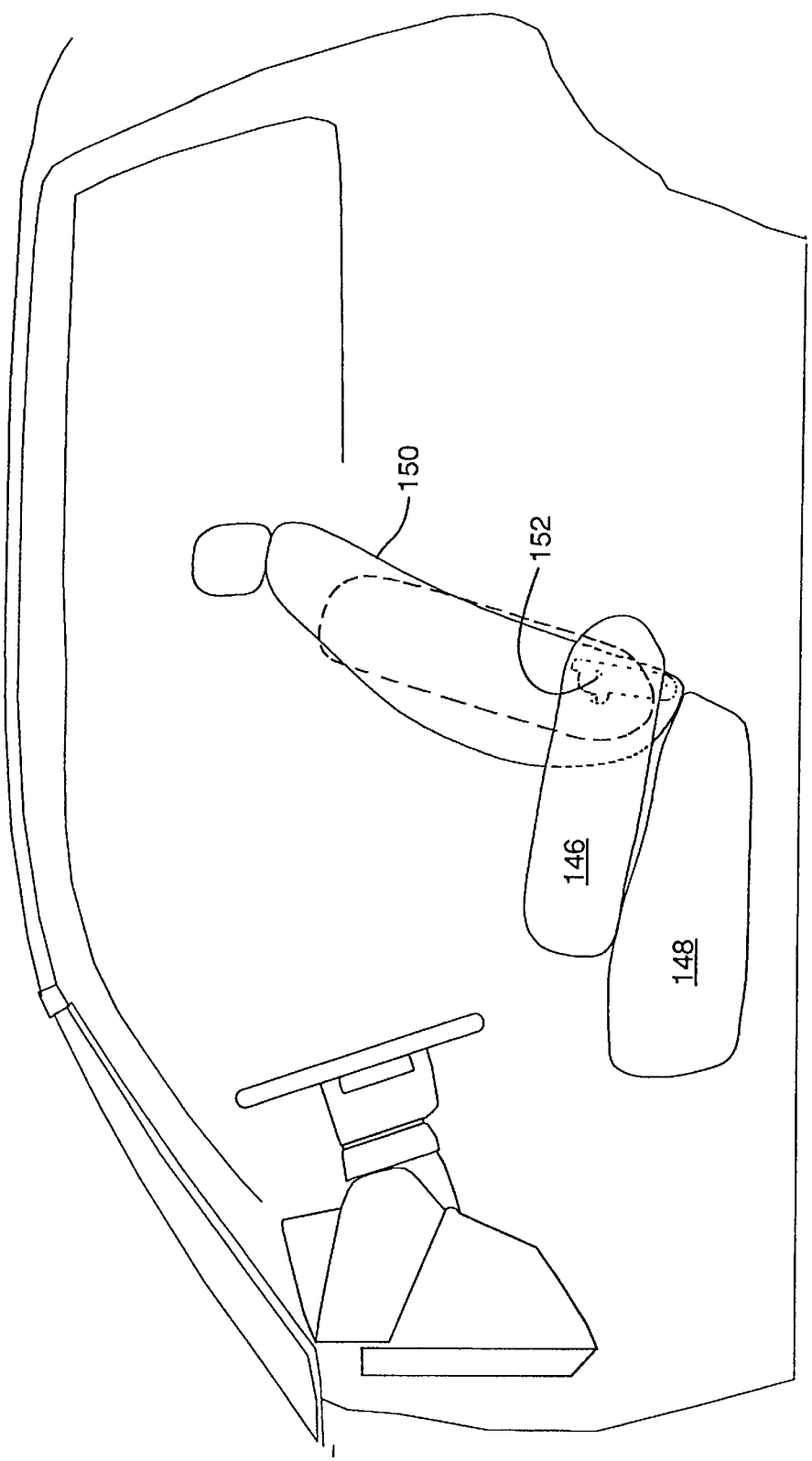
FIG. 21 is a left side elevational view showing an armrest in the lowered position with the raised position depicted by a dashed line.
Figure 22:
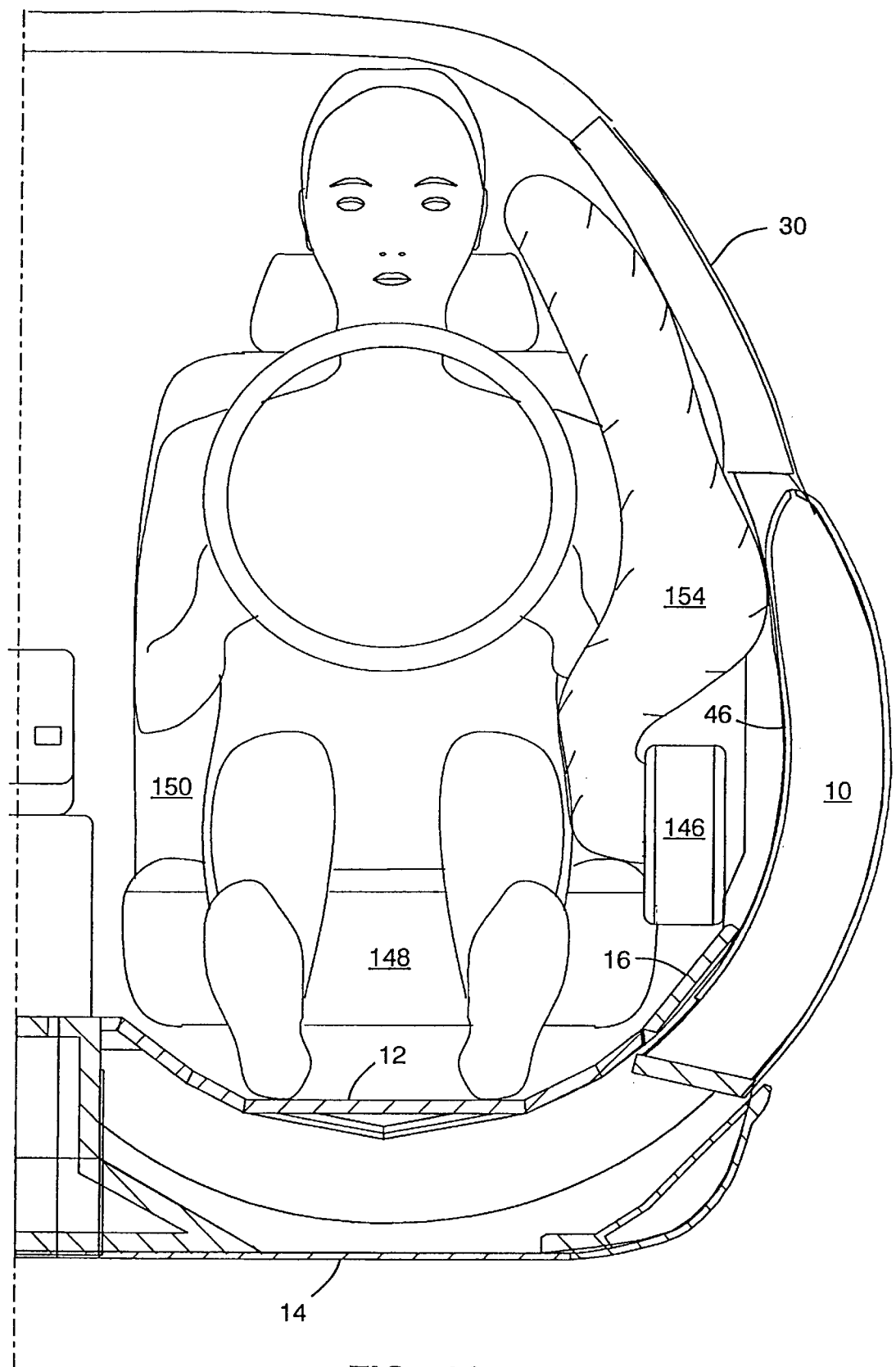
FIG. 22 is a front elevational cross-sectional view illustrating a side air bag being deployed from an armrest.

FIGS. 1–3 and 21–22 show the novel armrest 146 positioned on the outboard side of seat 148. Armrest 146 is pivotally mounted to allow it to be positioned upright alongside seat back 150, as shown in FIGS. 1 and 2, or pivoted down into a working position, as shown in FIGS. 3, 21, and 22. The upright position of armrest 146 is used when a passenger is entering or exiting the vehicle through door 10. Armrest 146 can be moved manually between the raised and lowered positions, or this motion can be performed by an automatic mechanism (not shown) that raises armrest 146 as door 10 is lowered into an open position, and lowers armrest 146 as door 10 is raised into a closed position.

In an alternate embodiment, the opening and closing of door 10 is activated by the raising and lowering, respectively, of armrest 146. This arrangement can be accomplished with a mechanical linkage (not shown) between armrest 146 and door 10, or by an electrical switch 151 mounted at the armrest pivot 152 for triggering of the door actuator to open the vehicle door upon raising of the armrest to the withdrawn position and to close the door upon lowering of the armrest to the working position. In yet another embodiment, door 10 can be manually opened or closed by a passenger seated in seat 148 by repetitively pivoting armrest 146 in a ratcheting motion. To allow seat 148 to be fully adjustable, it is envisioned that a cable (not shown) would link the pivoting motion of armrest 146 with a ratchet mechanism (not shown) beneath floor 12 and operatively connected to door 10.

As shown in FIG. 22, an air bag 154 can be deployed from armrest 146 to protect a passenger P in an accident having a component of side impact. Alternatively, armrest 146 can include a bolster fabricated from a progressively deformable material to absorb the energy from a side impact. The progressively deformable material allows the passenger to be optimally protected in a wide range of side impact magnitudes. In both of the above arrangements, armrest 146 should be mounted to seat 148 such that the lowered working position of armrest 146 remains constant with respect to a passenger through the full range of adjustments that can be made to seat 148. The preferred position of an armrest 146 utilizing a progressively deformable material is adjacent to the passenger's hip. The optimal positioning of an armrest and safety equipment, relative to a passenger in an adjustable seat 148, is facilitated by the new armrest 146 as compared to the armrest of a conventional door.

The armrest 146 may also be used to present a safety belt in an easily visible and reachable location to the passenger as armrest 146 is lowered into its working position. This can be accomplished by a clip (not shown) mounted to armrest 146 and slidably captivating a safety belt, a much simpler and less awkward arrangement than the automatic, overhead track mounted seat belt systems found in many current model vehicles.

The above-described improvements to a vertically sliding door can also be applied to less conventional door arrangements, such as the rear mini-van door configuration currently envisioned by the applicant and illustrated in FIGS. 23A–23F. The rear van door opening 156 is movably closed by a vertically sliding door 158 and a second panel, preferably a window 160, which is independently retractable into door 158. Instead of retracting below the floor 12, the door 158 of this embodiment retracts above the roof or into a roof compartment 162 formed on top of the vehicle. It is envisioned that roof compartment 162 can also serve as an air wing or part of a luggage rack.

Figure 23B:
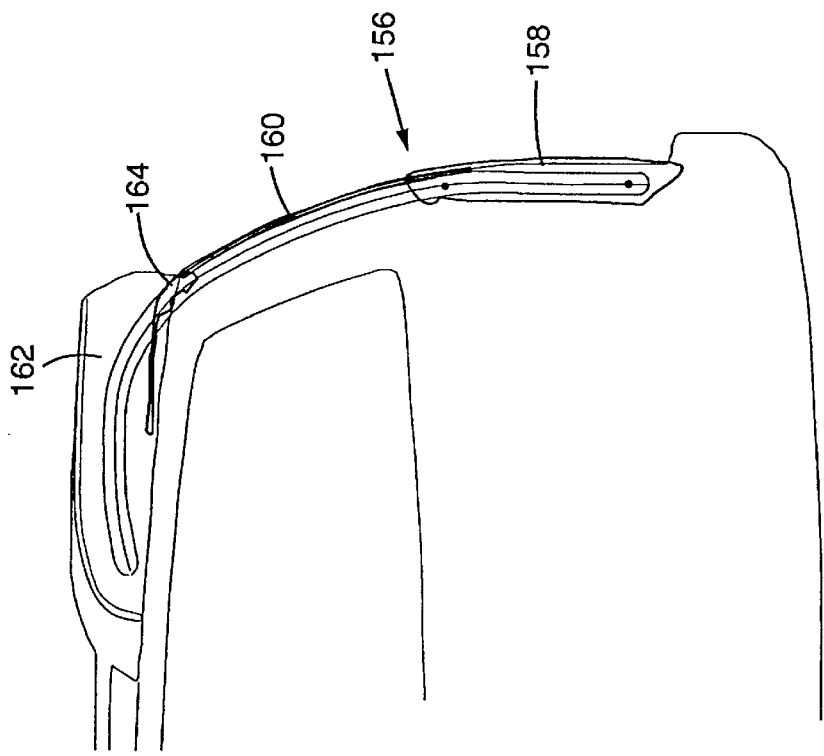
FIGS. 23A through 23F are side elevational cut-away views showing the rear portion of a mini-van and illustrating the sequence of motions involved in opening the vertically sliding door of an alternate embodiment of the invention.
Figure 23A:
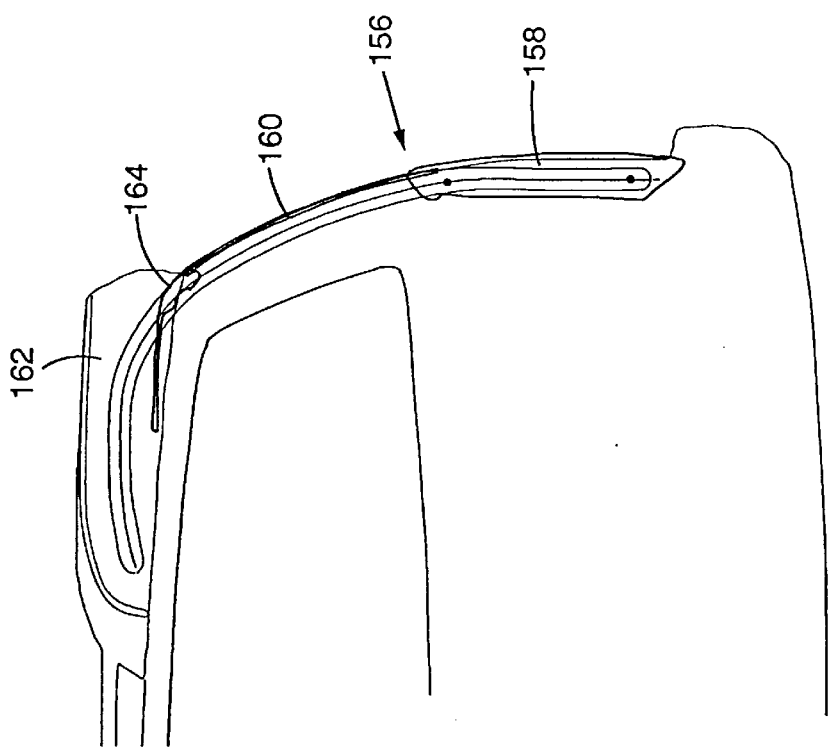

In the closed position of door 158 shown in FIG. 23A, structural keys (not shown) interlock with mating receptacles to allow door 158 to form an integral structural member of the vehicle's chassis frame in a manner nearly identical to that described above for side doors 10. In this embodiment, however, the previously described upper key members 18 and upper mating receptacles 20 are now located at the bottom of door 158, and lower key members 26 and lower mating receptacles 31 are located at the top of door 158. Mid-door flange members 22 and mating mid-channel lip members 24 for the central horizontal intrusion member 144 remain the same.

Figure 23D:
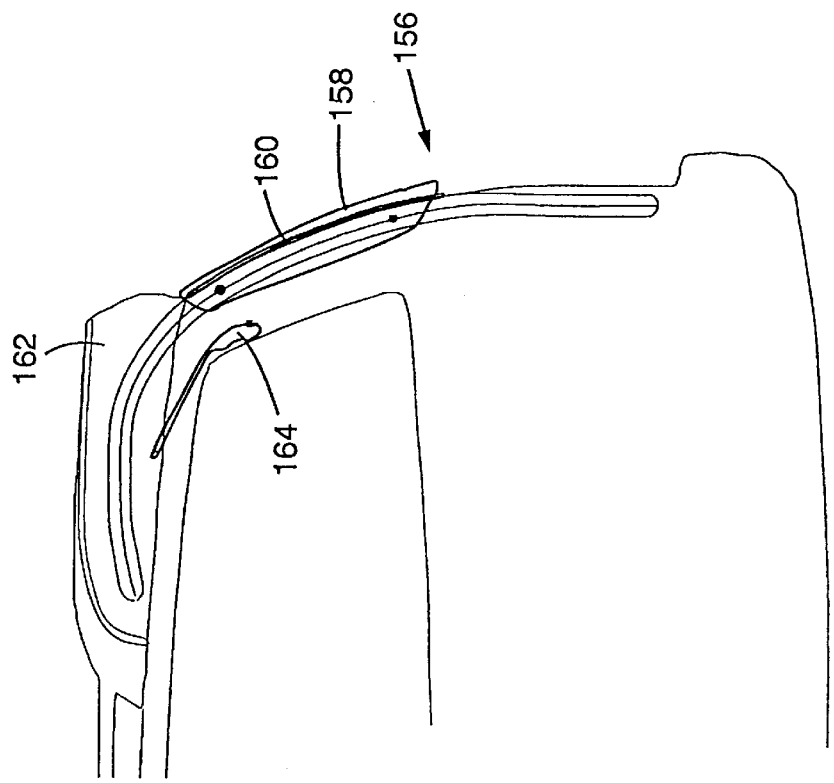
Figure 23C:
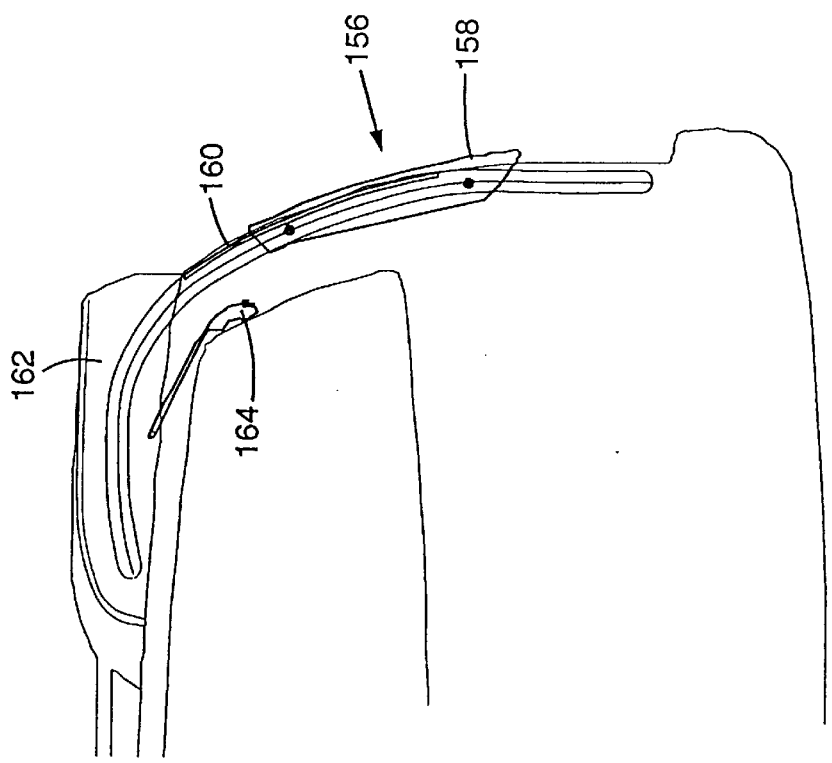
Figure 23F:
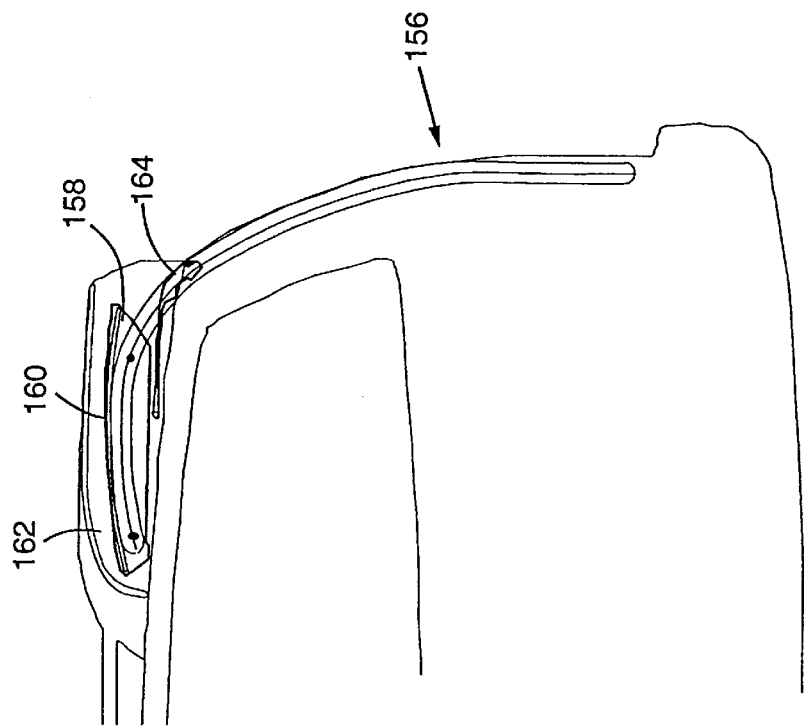
Figure 23E:
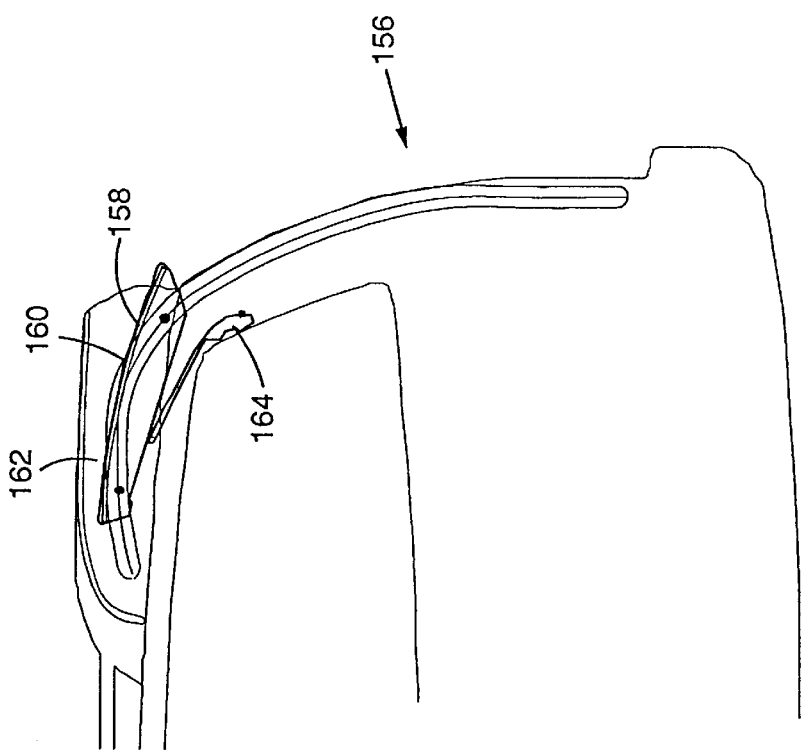

The sequence of opening van door 158 is described below. FIG. 23A shows door 158 and window 160 in a closed (lowered) position. Window 160 retracts down into door 158 enough to clear the inverted [U] seal at the top edge of window 160, as shown in FIG. 23B. If a flat, traditional frame-type window seal is used instead of a [U] seal, this step may be omitted. Door 158 starts its upward travel and window 160 continues to be retracted into the door, as shown in FIG. 23C. The rear roof flap 164 is automatically lowered in order to allow passage of the door 158 and window 160 combination onto the roof of the vehicle. FIG. 23D shows window 160 fully retracted into door 158 which continues its upward travel. FIG. 23E shows the door 158 and window 160 combination continuing toward its docking position. In FIG. 23F, the door 158 and window 160 combination is docked in its final, fully open position in roof compartment 162 and spring loaded rear roof flap 164 is returned to its original position.

Closing the door 158 and window 160 combination is accomplished by reversing the above steps. When door 158 is in a closed position, window 160 may be independently operated as in previously described embodiments. In this embodiment, the same structural and consumer conveniences as the previous embodiments are preserved, with the additional benefit of having an undisturbed mechanical component packaging of the lower chassis frame.

The above descriptions and drawings are for illustrative purposes only. It is to be understood that the present invention is not limited to the sole embodiments described above and illustrated herein, but encompasses any and all variations falling within the scope of the appended claims.

What is claimed as the invention is:

1. In a motor vehicle having a lateral door movable between a closed position and an open position and a passenger seat located to the interior of and adjacent the door, said seat having an upwardly disposed backrest portion and a lower seat portion disposed at a level below the backrest, portion, the improvement comprising:

a) an armrest carried by the seat in a disposition located between the seat and the door for movement between a withdrawn position permitting substantially unobstructed ingress and egress to the seat through the door when open and a working position disposed above the level of the lower seat portion and between the seat and door when the door is in the closed position; and, b) means for opening the door by moving the armrest to the withdrawn position and for closing the door by moving the armrest to the working position.

\* \* \* \* \*

UNITED STATES PATENT AND TRADEMARK OFFICE
CERTIFICATE OF CORRECTION

PATENT NO : 5,918,926
DATED : July 6, 1999
INVENTOR(S) : John A. Townsend

It is certified that error appears in the above-identified patent and that said Letters Patent is hereby corrected as shown below:

Col. 14, line 43 please delete "," after --backrest--.

Signed and Sealed this

Twenty-first Day of December, 1999

Q. TODD DICKINSON

*Attest:*

*Attesting Officer*    Acting Commissioner of Patents and Trademarks